US011155185B2

(12) United States Patent
Rose et al.

(10) Patent No.: US 11,155,185 B2
(45) Date of Patent: Oct. 26, 2021

(54) CONTROL OF A SEATING ARRANGEMENT

(71) Applicant: JAGUAR LAND ROVER LIMITED, Warwickshire (GB)

(72) Inventors: Nigel Rose, Coventry (GB); Sheraz Ahmed, Coventry (GB); Vinay Vaidya, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 376 days.

(21) Appl. No.: 16/145,617

(22) Filed: Sep. 28, 2018

(65) Prior Publication Data

US 2019/0106018 A1 Apr. 11, 2019

(30) Foreign Application Priority Data

Oct. 9, 2017 (IN) .............................. 201711035840
Dec. 18, 2017 (GB) ...................................... 1721157

(51) Int. Cl.
*B60N 2/02* (2006.01)
*B60N 2/90* (2018.01)
*B60N 2/00* (2006.01)
*B60N 2/859* (2018.01)
*B60N 2/853* (2018.01)

(52) U.S. Cl.
CPC .......... *B60N 2/0252* (2013.01); *B60N 2/002* (2013.01); *B60N 2/0244* (2013.01); *B60N 2/853* (2018.02); *B60N 2/859* (2018.02); *B60N 2/995* (2018.02); *B60N 2/0232* (2013.01); *B60N 2002/0272* (2013.01)

(58) Field of Classification Search
CPC ...... B60N 2/0252; B60N 2/859; B60N 2/853; B60N 2/995; B60N 2/002; B60N 2/0244; B60N 2/0232; B60N 2002/0272
See application file for complete search history.

(56) References Cited

U.S. PATENT DOCUMENTS

2017/0282754 A1 10/2017 Zouzal et al.
2018/0147958 A1* 5/2018 Tarade ..................... B60N 2/68

FOREIGN PATENT DOCUMENTS

DE 10 2015 219 059 A1 4/2017
GB 2539501 A 12/2016
WO 2016/020185 A1 2/2016

OTHER PUBLICATIONS

Combined Search and Examination Report under Sections 17 and 18(3) for Application No. GB1721157.4 dated Jun. 8, 2018.

* cited by examiner

*Primary Examiner* — Tyler J Lee
*Assistant Examiner* — Yufeng Zhang
(74) *Attorney, Agent, or Firm* — Carlson, Gaskey & Olds

(57) ABSTRACT

A method of controlling movement of a first component of a vehicle, the first component being a squab or a bulkhead of a rear seat of a vehicle seating arrangement. The method involves receiving a signal indicative of a state of a second component of the vehicle and receiving a request to move the bulkhead so that the seat is in a folded condition. The squab of the rear seat is moved into engagement with the bulkhead of the rear seat prior to moving the bulkhead; and movement of the bulkhead is commenced in accordance with the request and in dependence on the signal indicative of the state of the second component.

20 Claims, 25 Drawing Sheets

CONTROL OF A SEATING ARRANGEMENT

CROSS REFERENCE TO RELATED APPLICATION

This application claims priority to Indian Patent Application No. 201711035840, filed on 9 Oct. 2017 and United Kingdom Patent Application No. GB 1721157.4, filed on 18 Dec. 2017.

TECHNICAL FIELD

The present disclosure relates to control of a seating arrangement. In particular, but not exclusively, the present invention relates to the control of a squab and/or a bulkhead of a rear seating arrangement of a vehicle, for example a saloon car or sport utility vehicle (SUV). Aspects of the invention relate to a method, to a controller, to a computer program product, to a non-transitory computer-readable medium and to a vehicle.

BACKGROUND

The large amount of space available in a standard sport utility vehicle (SUV) allows a user to reconfigure the seating of the SUV to carry passengers or a larger load. However, the ability to reconfigure the seating in luxury SUVs, and luxury vehicles generally, is often compromised as the seats tend to be more bulky than those used in standard passenger cars as they are optimised for comfort over versatility. In particular, the relatively large size of the backrests, or 'squabs', and seat cushions of the seats of luxury vehicles restricts the possible extent to which they may be folded.

The materials and components used in luxury vehicle seating also do not readily allow reconfiguration of the seating.

Additionally, rear seat assemblies in luxury passenger cars often comprise an armrest assembly located between the rear seats of the passenger vehicle. The armrest is moveable between a rearward, generally vertical stowed configuration and a forward, generally horizontal deployed configuration. The presence of the armrest adds to the complexity of the rear seating assembly in luxury vehicles, and inhibits the seating assembly from being easily reconfigurable to increase the loadspace available to a user.

In consequence, it is typically impractical to fold the rear seats in a luxury vehicle to increase the loadspace available, and so the load carrying capability of a luxury vehicle is more restricted than for an equivalent standard vehicle.

Aside from increasing loadspace, more functionality may be required from the seats themselves in a luxury vehicle. For example, it may be desirable for a rear seat to have the ability to recline to increase comfort. Moreover, such movement may be automated by a system of motors controlled through a user interface. Such features are particularly relevant for luxury vehicles targeted at customers who will tend to be chauffeur driven.

It is against this background that the present invention has been devised.

SUMMARY OF THE INVENTION

According to an aspect of the invention, there is provided a method of controlling movement of a first component of a vehicle, the first component being a bulkhead of a rear seat of a vehicle seating arrangement. The method comprises: receiving a signal indicative of a state of a second component of the vehicle; receiving a request to move the bulkhead so that the seat is in a folded condition; moving the squab of the rear seat into engagement with the bulkhead of the rear seat prior to moving the bulkhead; and commencing movement of the bulkhead in accordance with the request and in dependence on the signal indicative of the state of the second component.

The second component may be any one of the following: a seat cushion of a seat of the seating arrangement; a squab of a seat of the seating arrangement; a headrest of the seating arrangement; a bulkhead of the seating arrangement; an armrest of the seating arrangement; a lid of the armrest; a cup holder of the armrest; a cup holder lid of the armrest; a calf rest of the seating arrangement; a ski-hatch of the seating arrangement; a vehicle door; a vehicle door handle; an element of a seat belt system of the seating arrangement; a motor of the seating arrangement; and an electrical component embedded within a cushion of the headrest.

The bulkhead and the squab may be moved together so that the seat is in a folded condition.

The request to move the first component may comprise a request to recline the first component.

The request to move the first component may originate from any one of: a switch device associated with the seating arrangement; an input module of the vehicle; and an application executing on a mobile device. Alternatively, the request to move the first component may be generated by a vehicle controller.

The second component may be a seat cushion of the rear seat of the seating arrangement or a seat cushion of a seat adjacent to the rear seat of the seating arrangement, in which case the signal indicative of the state of the second component optionally comprises an indication of a load applied to the seat cushion, and may originate from a sensor embedded within the seat cushion. The sensor may form part of an occupancy detection system, for example. Such embodiments may further comprise disabling movement of the first component if a load applied to the seat cushion exceeds a threshold. Additionally, the signal indicative of the state of the second component may comprise an indication of a position of the seat cushion, in which case the method may comprise commencing movement of the first component only if the seat cushion is outside a first clash zone between the seat cushion and the seat squab. The method may also comprise moving the seat cushion to a position outside the first clash zone if the signal indicative of the state of the second component indicates that the seat cushion is in the first clash zone, and then commencing movement of the first component.

In other embodiments, the second component is a ski-hatch of the seating arrangement or a lid of an armrest adjacent to the seat, and wherein the signal indicative of the state of the second component comprises an indication of a position of the second component. Such embodiments may comprise commencing movement of the first component only if the second component is in a closed position.

The second component may be an element of a seat belt system associated with the seat of the seating arrangement or a seat adjacent to the seat of the seating arrangement, in which case the method may comprise commencing movement of the first component only if the signal indicative of a state of the second component indicates that the seat belt system is not engaged.

The second component may be a squab or seat cushion of a front seat of the seating arrangement, the front seat being positioned directly ahead of the rear seat, in which case the signal indicative of the state of the second component may comprise an indication of a position of the squab or seat cushion of the front seat. Such embodiments may comprise commencing movement of the first component only if the squab or seat cushion of a front seat is outside a second clash zone between the front seat and the rear seat. The method may also comprise moving the squab or seat cushion of the front seat to a position outside the second clash zone between the front seat and the rear seat if the signal indicative of the state of the second component indicates that the squab or seat cushion of the front seat is in the second clash zone between the front seat and the rear seat, and then commencing movement of the first component. In such embodiments, the method may comprise determining whether the front seat is occupied prior to moving the front seat, and moving the front seat to a safe configuration if the front seat is occupied, and to a folded configuration if the front seat is not occupied. When the front seat is in the safe configuration, a squab of the front seat may be generally upright to allow the front seat to accommodate a passenger, and the front seat may be displaced forwards within the vehicle to increase space available for movement of the rear seat.

In other embodiments, the second component is a vehicle door adjacent to the rear seat, or a door handle of the door adjacent to the rear seat, in which case the signal indicative of the state of the second component indicates, respectively, opening of the door or actuation of the door handle. Such embodiments may comprise moving the squab of the rear seat and a cushion of the rear seat to arrange the rear seat in an egress configuration on receiving an indication of opening of the door. For example, when the rear seat is in the egress configuration, the squab of the rear seat may be oriented generally vertically, the cushion of the rear seat may be displaced aft relative to a front seat positioned ahead of the rear seat, and a calf rest of the rear seat may be stowed.

The method may comprise monitoring for a pinch condition after commencing movement of the first component, and ceasing such movement upon detection of a pinch condition.

In some embodiments, the method comprises controlling an actuator to release the first component prior to commencing movement of the first component.

Other aspects of the invention provide a controller for a vehicle seating arrangement, the controller being configured to perform the method of the above aspect, a computer program product comprising computer readable code for controlling a computing device to perform the method of the above aspect to control movement of a first component of a vehicle seating arrangement, and a non-transitory computer readable medium comprising such a computer program product.

The invention also extends to a vehicle comprising the controller of the above aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of the invention relate to methods and corresponding control systems for guiding operation of elements of a motorised seating arrangement for a vehicle. Due to the complexity of the seating arrangement, which comprises various movable elements, each movement must be managed carefully to avoid collisions with other vehicle components and to ensure the comfort and safety of any occupants of the vehicle.

Before moving on to consider these embodiments in detail, to put the invention into context a seating arrangement to which such embodiments are applicable is described with reference to FIGS. 1 to 20.

Figure 1:
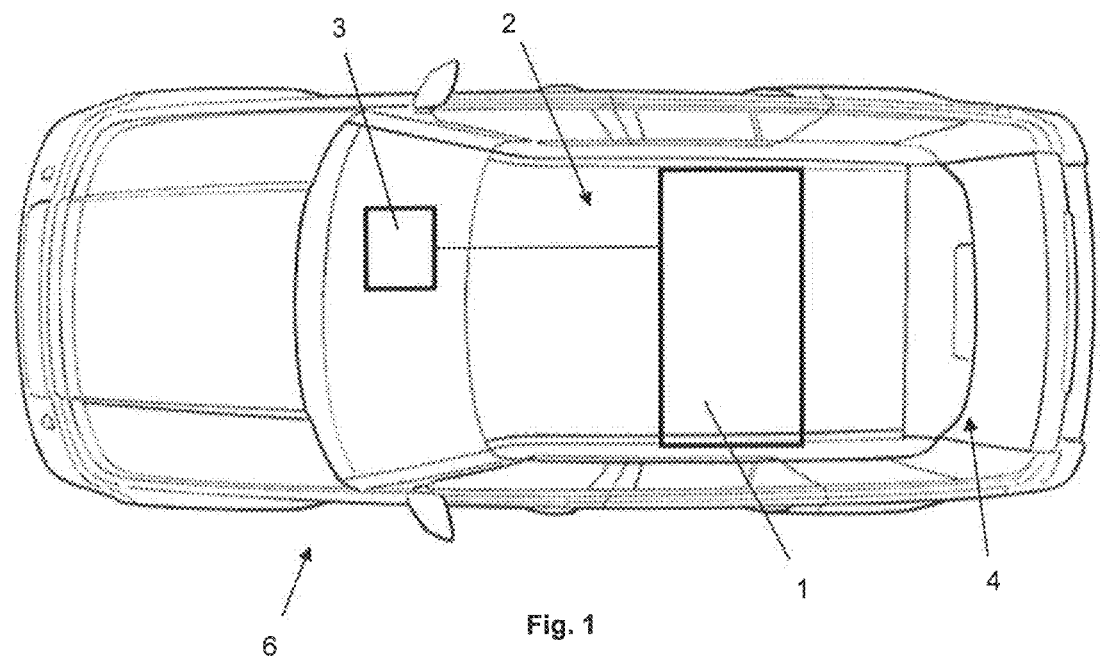
FIG. 1 is a top view of a vehicle comprising a rear seating arrangement suitable for use in embodiments of the invention.
Figure 2:
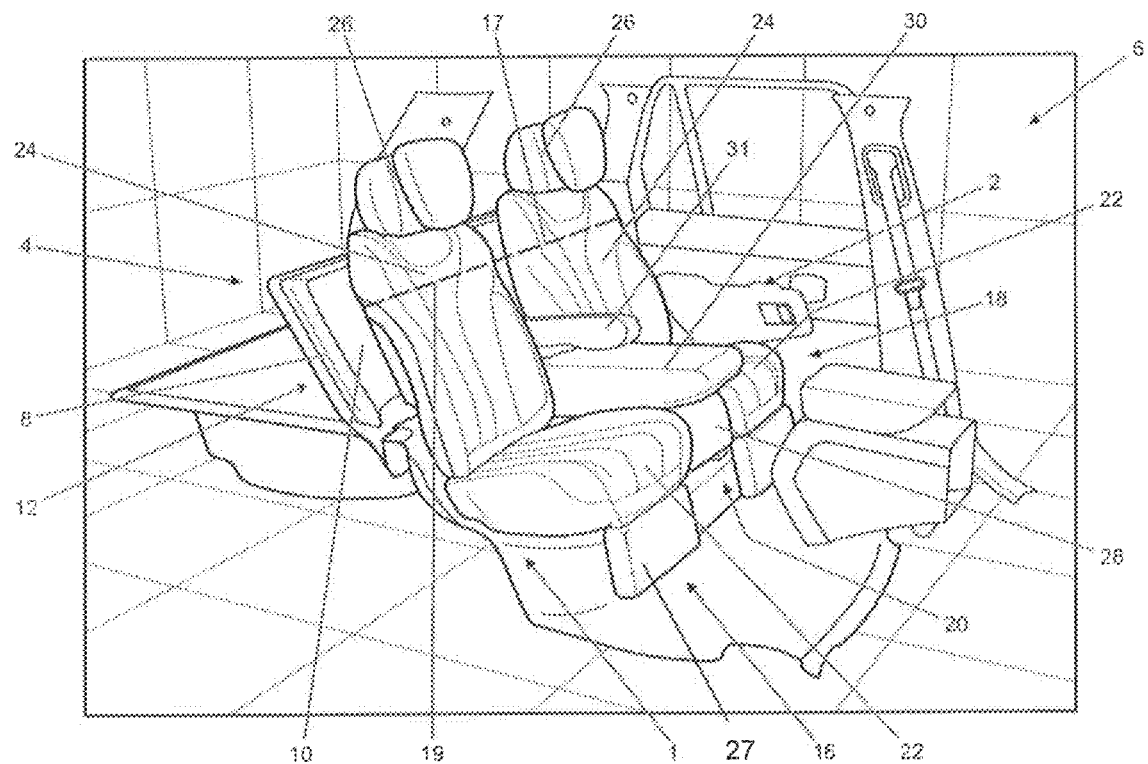
FIG. 2 is a schematic perspective view of an example of the rear seating arrangement of FIG. 1.

FIG. 1 shows in plan view, and in simplified form, a luxury vehicle 6 comprising a rear seating arrangement or seating assembly 1 and a control system 3 for controlling movement of components of the rear seating arrangement 1 according to embodiments of the invention. The rear seating arrangement 1 is disposed in a passenger compartment 2 of the vehicle 6, and a loadspace 4 is defined behind the seating arrangement 1. FIG. 2 shows an example of the rear portion of the passenger compartment 2 and the loadspace 4 of the vehicle 6 in perspective view.

In the description that follows, the terms "forwards", "backwards", "fore", "aft", "forwardmost" and "rearmost" are used to describe positions or locations of features relative to the vehicle 6. For example, the terms "forwards" and "forwardmost" refer to locations or positions towards or nearer the front of the vehicle 6, and "backwards" and "rearmost" refer to locations or positions towards or nearer the rear of the vehicle 6.

The rear portion of the passenger compartment 2 comprises the seating arrangement 1, which is shown in a default configuration in FIG. 2. As seen most clearly in FIG. 2, when the seating arrangement 1 is in the default (unfolded) configuration, the passenger compartment 2 in the illustrated example is separated from the loadspace 4 by a bulkhead 8 of the seating arrangement 1 that extends transversely between opposed sides of the vehicle 6. The loadspace 4 is commonly referred to as the "trunk" or "boot" or "cargo space" of a vehicle. Luggage and other items are typically loaded into the loadspace 4 by opening a hinged hatch or door (not shown) at the rear of the vehicle 6 to provide access to the loadspace 4. The bulkhead 8 has a first surface 10 and a second surface 12, with the first surface 10 of the bulkhead 8 facing the passenger compartment 2 and the second surface 12 facing the loadspace 4 when the seating arrangement 1 is in the default configuration illustrated in FIG. 2.

Figure 3:
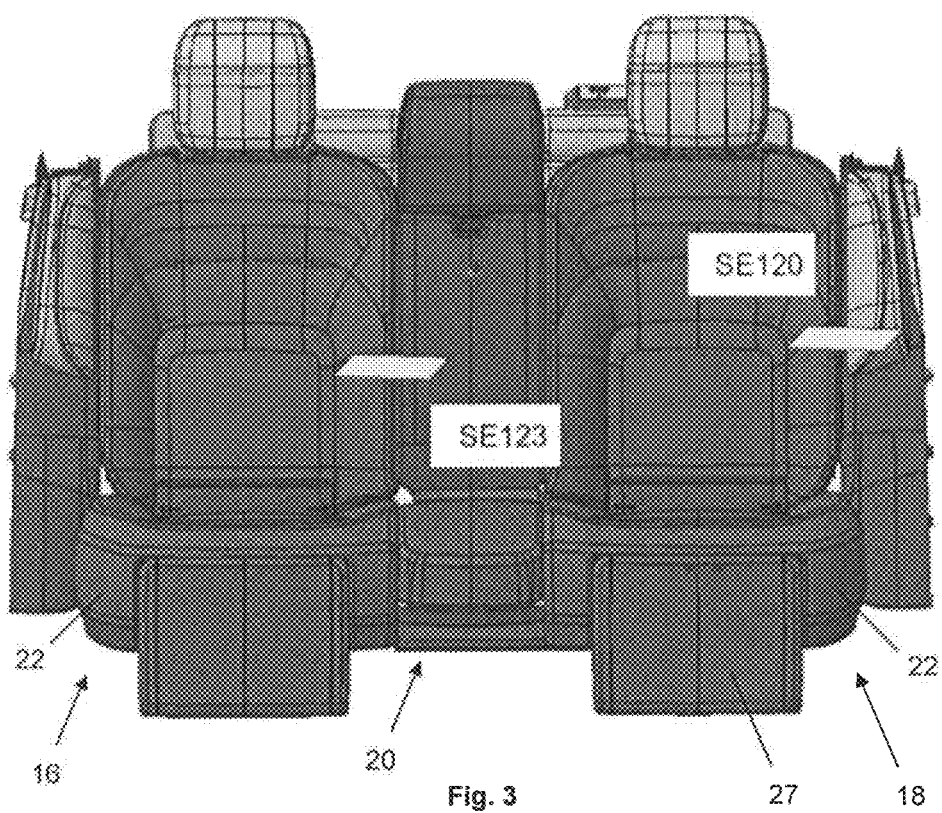
FIG. 3 corresponds to FIG. 2 but shows a front view of the rear seating arrangement.
Figure 4:
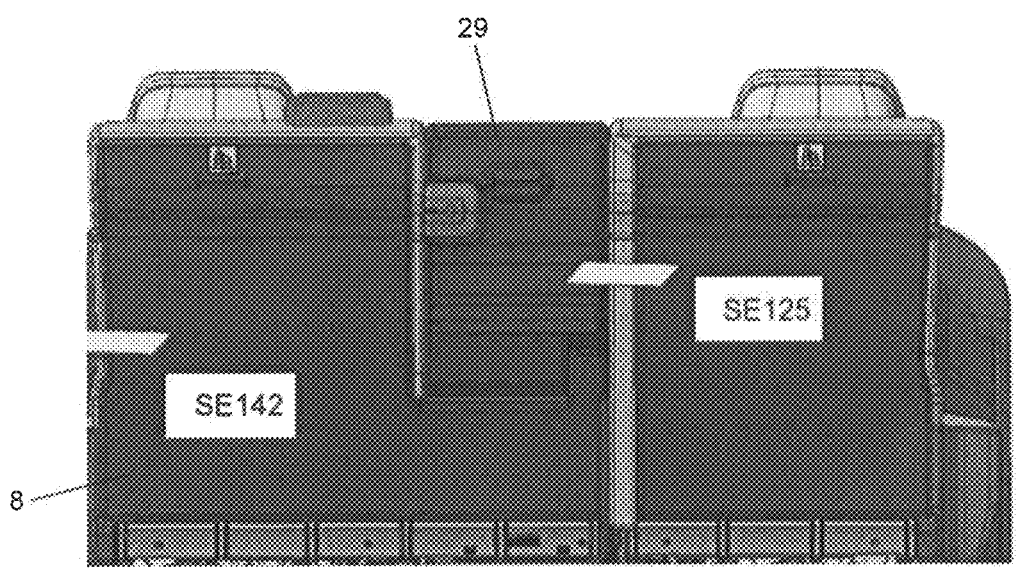
FIG. 4 corresponds to FIG. 2 but shows a rear view of the rear seating arrangement.

The seating arrangement 1 is shown from the front in FIG. 3, and from behind in FIG. 4. FIGS. 1 to 4 will now be described together.

The seating arrangement 1 comprises a first seat 16, a second seat 18 and a separating portion defining a central seat 20, the central seat 20 being located between the first seat 16 and the second seat 18. The bulkhead 8 is located rearward of the first, second and central seats 16, 18, 20.

Each of the first and second seats 16, 18 comprises a seat cushion 22, a squab 24, a headrest 26 and a calf rest 27. The squabs 24 are located adjacent to the first surface 10 of the bulkhead 8 when the seating arrangement 1 is in the default configuration.

The central seat 20 comprises a central cushion 28 and a backrest that is pivotable to function as an armrest 30. The armrest 30 is shown in a deployed configuration in FIG. 2, in which the armrest 30 is oriented generally horizontally. The armrest 30 is movable to a stowed configuration, described in more detail below, in which the armrest 30 is oriented generally vertically to form the separating backrest for the central seat 20.

Although not visible in FIGS. 1 to 4, the first, second and central seats 16, 18, 20 typically also comprise seat belt assemblies. For example, the first and second seats 16, 18 typically comprise conventional three-point seat belt systems, whereas the central seat 20 may be provided with a two-point lap belt system. Each of these seat belt systems may comprise sensors that are configured to generate signals that are indicative of whether or not the respective seat belt has been fastened, and thus whether or not the respective seat belt system is engaged.

Additionally, each of the first, second and central seats 16, 18, 20 may be fitted with one or more sensors that are arranged to detect the presence of an object such as a passenger in the respective seat. Such sensors will be familiar to the skilled reader, and may be embedded within the seat cushions 22, 28, for example. The sensors may form a part of an occupant detection system and may be arranged to generate signals indicative of a load applied to the seat cushion 22, 28. The occupancy detection system may determine that the seat 16, 18 is occupied if the indicated load exceeds a threshold, for example.

The seating arrangement 1 is referred to in the art as a 40-20-40 split: the first seat 16 comprises approximately 40% of the seating space of the seating arrangement 1, the central seat 20 comprises approximately 20% of the seating space of the seating arrangement 1 and the second seat 18 comprises approximately 40% of the seating space of the seating arrangement 1.

As best seen in FIG. 4, the bulkhead 8 in the illustrated example comprises a hinged opening defining a ski-hatch 29, which can be opened when the armrest 30 is deployed to allow elongate objects, such as skis 31, to extend from the loadspace 4 into the passenger compartment 2. FIG. 2 shows the seating arrangement 1 with the ski-hatch 29 in an open configuration and the skis 31 extending therethrough into the passenger compartment 2. FIGS. 3 and 4 show the seating arrangement 1 with the ski-hatch 29 in a closed configuration.

In some embodiments, the default configuration of the seating arrangement 1 shown in FIGS. 1 to 4, in which the squabs 24 are generally upright but not reclined, the cushions are in a generally rearward position and the calf rests 27 are stowed, defines an egress configuration for each seat 16, 18 of the seating arrangement 1.

Such an egress configuration is arranged to facilitate egress from or entry to the respective seat 16, 18 by positioning the seat 16, 18 in an accessible arrangement, and may be optimised for each vehicle model. Moreover, the egress configuration may be user customisable through a vehicle infotainment system, for example. Thus, the egress configuration may not exactly correspond to the default configuration shown in FIGS. 1 to 4.

The control system 3 may be arranged to control movement of the components of the rear seating arrangement 1 to move the first seat 16 or the second seat 18 into its egress configuration when a vehicle door adjacent to the relevant seat 16, 18 is operated.

Figure 12:
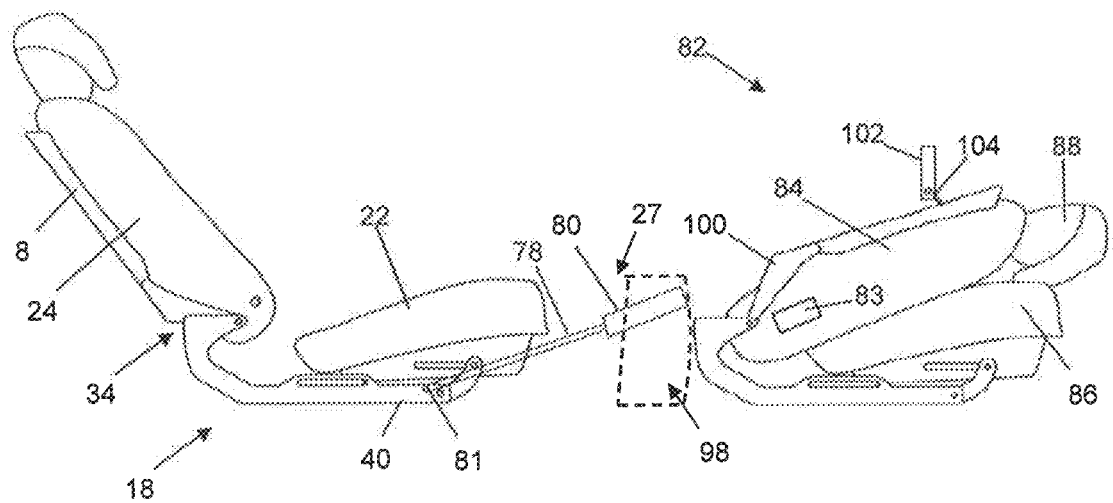
FIG. 12 is a side view of an example of a seat of the rear seating arrangement in a reclined configuration.

For example, the second seat 18 may be in a reclined configuration when the door directly adjacent to the second seat 18 is operated. An example of a reclined configuration is shown in FIG. 12, and entails that the squab 24 is tilted rearward, the cushion 22 is shifted forward and the calf rest 27 is deployed. In this situation, on sensing operation of the door the control system 3 acts to reconfigure the second seat 18 automatically to tilt the squab 24 forwards, shift the cushion 22 aft and stow the calf rest 27, thereby assuming the egress configuration.

The precise manner in which the components of the seating arrangement 1 are moved by the control system 3 shall become clear in the description that follows.

Operating a door may act as a trigger for commencing movement of a seat 16, 18 to an egress configuration, and may comprise actuation of an internal or external door handle, as indicated by a door handle sensor, or opening of a door as indicated by a door sensor.

In some embodiments, only the seat adjacent to the door or door handle that is operated is moved to the egress configuration, but optionally both the first and second seats 16, 18 may be moved to their egress configurations when a door next to either one of them is operated.

If automated movement to the egress configuration is desired only for vehicle egress, optionally the control system 3 may check for occupancy of the relevant seat 16, 18 when a door is operated. Such information may be gathered from an occupancy detection system for the relevant seat 16, 18, for example. Such systems may include a sensor embedded within the relevant seat cushion 22 that is arranged to generate a signal indicative of a load applied to the seat cushion 22. If the load exceeds a threshold, the occupancy detection system determines that the seat 16, 18 is occupied.

Similarly, in such embodiments movement to the egress configuration may be disabled if the relevant seat 16, 18 is folded, since a folded seat can be assumed to be unoccupied.

It will be appreciated that if the control system 3 is arranged to move the seats 16, 18 to an egress position on occasions where a person is entering the vehicle 6, there is no need to check for occupancy of the seat 16, 18, or whether the seat 16, 18 is folded.

Figure 5:
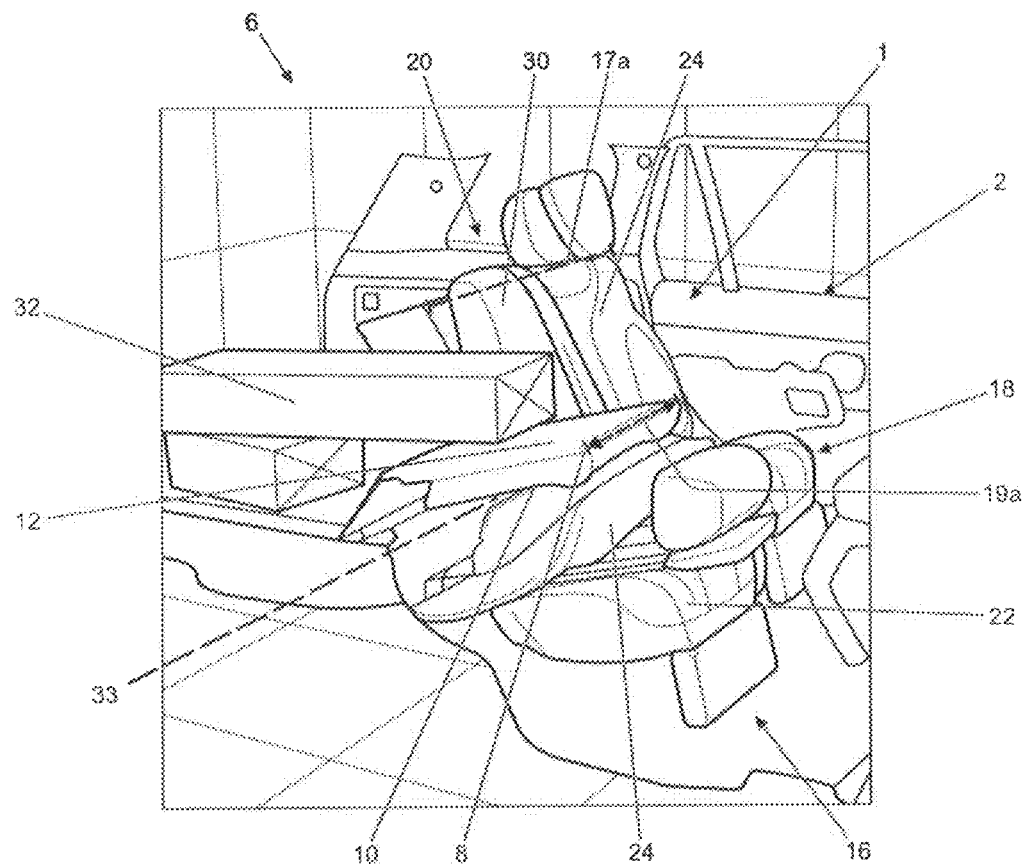
FIG. 5 corresponds to FIG. 2, but shows the rear seating arrangement in a partially folded configuration.

The seating arrangement 1 is shown in FIG. 5 in a partially-folded configuration. The bulkhead 8 is asymmetrically divided into a major bulkhead portion 17a and a minor bulkhead portion 19a. Accordingly, the seating arrangement 1 is divided into corresponding portions: a major portion 17 and a minor portion 19. The major portion 17 comprises the second seat 18, the central seat 20 and armrest 30, and the major bulkhead portion 17a. The minor portion 19 comprises the first seat 16 and the minor bulkhead portion 19a. In the example shown, the seating arrangement 1 has a 40-20-40 split meaning the major bulkhead portion 17a and the minor bulkhead portion 19a is typically a 60-40 split.

The first, second and central seats 16, 18, 20 are arranged so that the squabs 24 and armrest 30 may each fold forward about an axis 33 extending transversely across the vehicle 6 parallel to the plane of the bulkhead 8. The bulkhead 8 is also arranged to fold forward in cooperation with the seats 16, 18, 20.

However, it is noted that the bulkhead 8 is separate to the squabs 24 of the first and second seats 16, 18, and so can move independently. The precise modes of operation will be described in more detail later, but at this stage it is noted that the provision of a bulkhead 8 that can fold independently of the seats 16, 18, 20 increases the versatility of the seating arrangement 1. For example, this configuration allows the bulkhead 8 to be used as a foundation for movement of the seat squabs 24, which is helpful in view of their relatively large size and weight resulting from the increased level of comfort that they are designed to provide. This arrangement also allows the bulkhead 8 to continue to separate the loadspace 4 from the passenger compartment 2 while the positions of the squabs 24 are adjusted.

In the partially-folded configuration shown in FIG. 5 the first seat 16 is in a folded configuration so that its squab 24 rests on its corresponding seat cushion 22. The central seat 20 and the second seat 18, i.e. the major portion 17a, is in an unfolded, default configuration. In this configuration the corresponding minor portion 19a of the bulkhead 8 is folded forward to lie on top of the squab 24, so that the first surface 10 of the minor portion 19a of the bulkhead 8 generally faces the floor of the passenger compartment 2 and the second surface 12 of the minor portion of the bulkhead 8 generally faces the roof of the passenger compartment 2. The partially-folded configuration allows a long load 32 to be carried by the vehicle 6 while allowing the second seat 18 and the central seat 20 to carry passengers.

Figure 6:
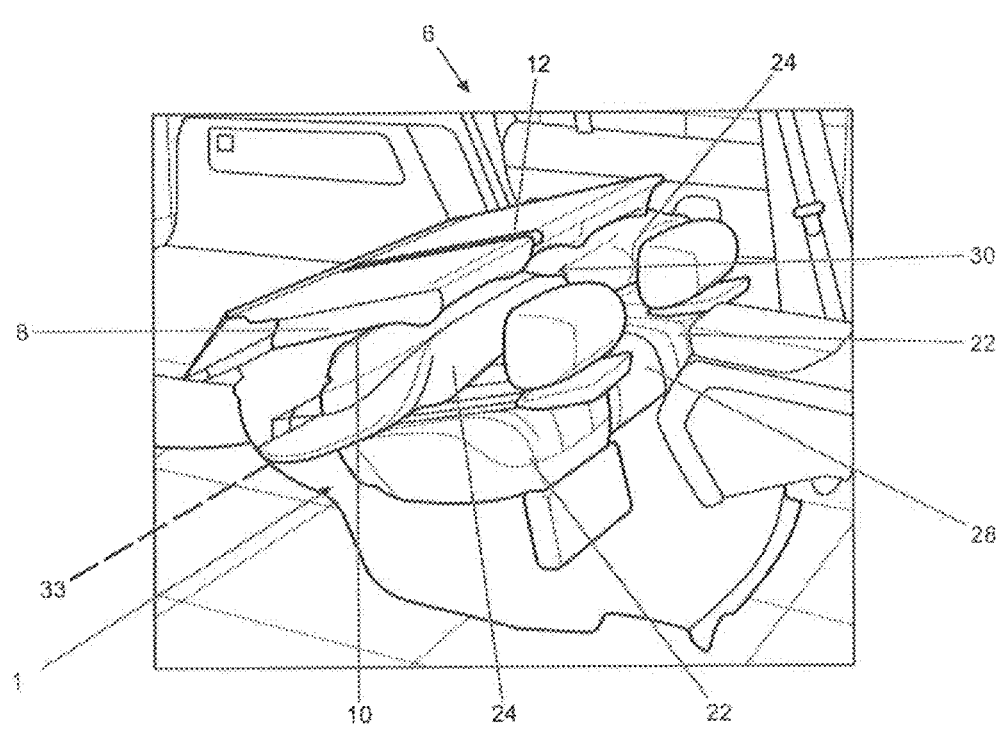
FIG. 6 corresponds to FIG. 2, but shows the rear seating arrangement in a fully folded configuration.

The seating arrangement 1 is shown in FIG. 6 in a fully-folded configuration, in which both of the squabs 24 and the armrest 30 are folded forward about the folding axis 33 so that each squab 24 and the armrest 30 engages its respective cushion 22, 28. In the fully-folded configuration, both the minor and major portions of the bulkhead 8 are folded forward to lie on top of the squabs 24 and armrest 30 so that the first surface 10 of the bulkhead 8 generally faces the floor of the passenger compartment 2 and the second surface 12 generally faces the roof of the passenger compartment 2. The fully-folded configuration allows a larger load (not shown) to be carried by the vehicle 6.

FIGS. 7a to 7e are side views of the first seat 16 of the seating arrangement 1, showing a bulkhead assembly 34 incorporating the bulkhead 8. Each of FIGS. 7a to 7e show the bulkhead assembly 34 and the seat 16 in sequential stages of movement as the seat 16 and bulkhead assembly 34 fold under the control of the control system 3.

The bulkhead assembly 34 comprises an upper support structure 38 and a lower support structure 40, the lower support structure 40 being connected to the upper support structure 38 by a pivotable joint 55.

The upper support structure 38 comprises the bulkhead 8 and a bulkhead bracket 46, to which the bulkhead 8 is mounted.

The seat cushion 22 is mounted on the lower support structure 40. Specifically, the cushion 22 comprises opposed laterally projecting rear pins 60 towards the rear of the cushion 22 that are received for linear sliding movement in slots 62 of the lower support structure 40, and is coupled to a pair of pivotable support arms 64 of the lower support structure 40 towards the front of the cushion 22, with one support arm 64 attached to each side of the cushion 22.

Each support arm 64 couples to the seat cushion 22 by a laterally projecting front pin 66 that is received in a cushion slot 68 formed in a base 70 of the seat cushion 22.

This arrangement provides two modes of fore-and-aft movement for the seat cushion 22: a first mode, in which the support arms 64 pivot while the front pins 66 remain in fixed positions in their respective cushion slots 68, to move the seat cushion 22 in a forward arc movement that raises the seat cushion 22 to some extent; and a second mode, in which the rear and front pins 60, 66 slide in their respective slots 62, 68 while the support arms 64 are held stationary, resulting in purely linear movement of the cushion 22. Providing two modes of movement provides greater flexibility in configuring the seat cushion 22 for comfort. The folding sequence shown in FIGS. 7a to 7e uses the first mode of movement, but it should be appreciated that the second mode of movement may equally be useful for a folding procedure.

The squab 24 is pivotally mounted on a pivoting member 92 that is aligned with the axis 33 about which the squabs 24 pivot. In turn, the pivoting member 92 is supported by a squab bracket 93 that is pivotably mounted on the pivotable joint 55. The pivoting member 92 allows the angle of the squab 24 relative to the seat cushion 22 to be altered by a passenger for comfort. The squab bracket 93 can pivot relative to the pivotable joint 55 to move the squab 24 relative to the bulkhead assembly 34, thereby creating further flexibility in repositioning the squab 24 for comfort. Equally, coupling the squab 24 to the pivotable joint 55 through the squab bracket 93 allows the squab 24 to fold together with the bulkhead 8 around the pivotable joint.

Figure 7A:
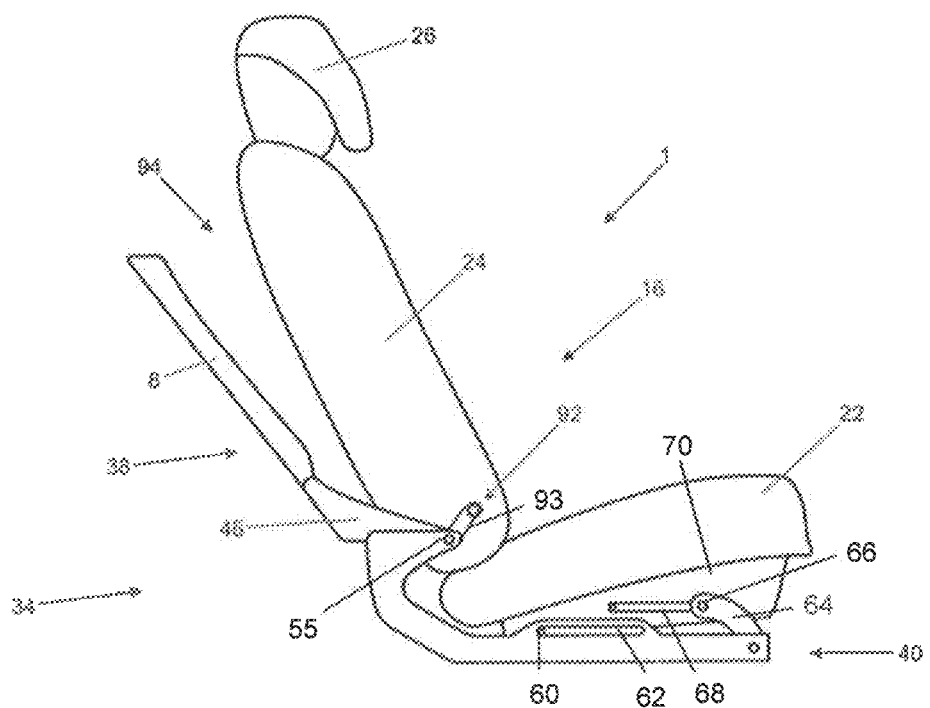
FIGS. 7a to 7e show an example of a first seat of the rear seating arrangement of FIG. 1 through a series of stages of a folding sequence of the seat.

FIG. 7a shows the squab 24 in a forward position, in which a void 94 is defined between the squab 24 and the bulkhead 8. The pivoting member 92 is not displaced from its rearward position in FIGS. 7a to 7e.

By allowing the squab 24 to pivot and move forwards and rearwards independently of the bulkhead 8, the arrangement shown in FIG. 7a allows a passenger to configure the first seat 16 for comfort without affecting the loadspace 4, which remains enclosed by the bulkhead 8.

Reconfiguration of the seating arrangement 1 between the unfolded, default configuration and the folded configuration may be activated using the control system 3. In this respect, the control system 3 comprises one or more switches that control a set of electric motors (shown in FIG. 19) that in turn effect movement of respective components of the rear seating arrangement 1. Pressing a switch generates an electronic request signal that activates the control system 3 to perform a relevant movement through appropriate operation of the electric motors.

Figure 7B:
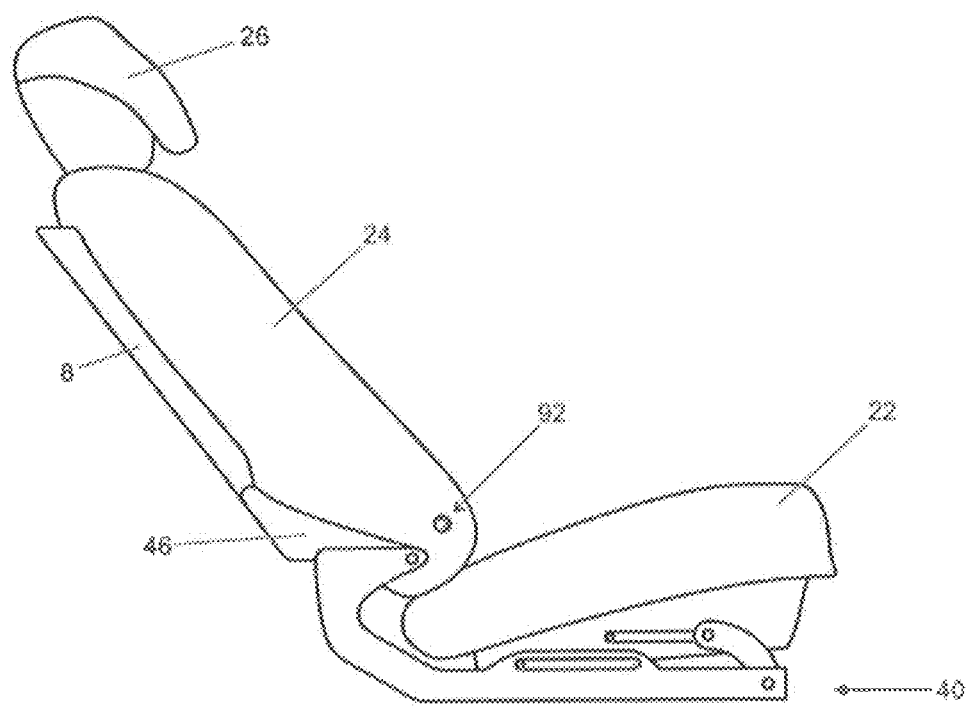

In this example, on activation of the control system 3 by an appropriate switch that controls folding of the seating arrangement 1, the control system 3 takes appropriate action. Specifically, the pivoting member 92, if displaced, returns to a rearward position, and the squab 24 automatically reclines to a rearward position in which the void 94 is eliminated and the squab 24 abuts the bulkhead 8, as shown in FIG. 7b. This abutting position is an initial position that the squab 24 may take to ensure that the bulkhead assembly 34 is in the correct position to be reconfigured from the unfolded configuration to the folded configuration. This provides the control system 3 with an initial reference from which to control folding movement of the seat 16 and bulkhead assembly 34, and thus assures completion of folding in the correct position.

Similarly, the seat cushion 22 may also return to an initial, rearward position corresponding to the position shown in FIG. 7b if the seat cushion 22 is positioned forwards of its initial position when folding is activated.

Figure 7C:
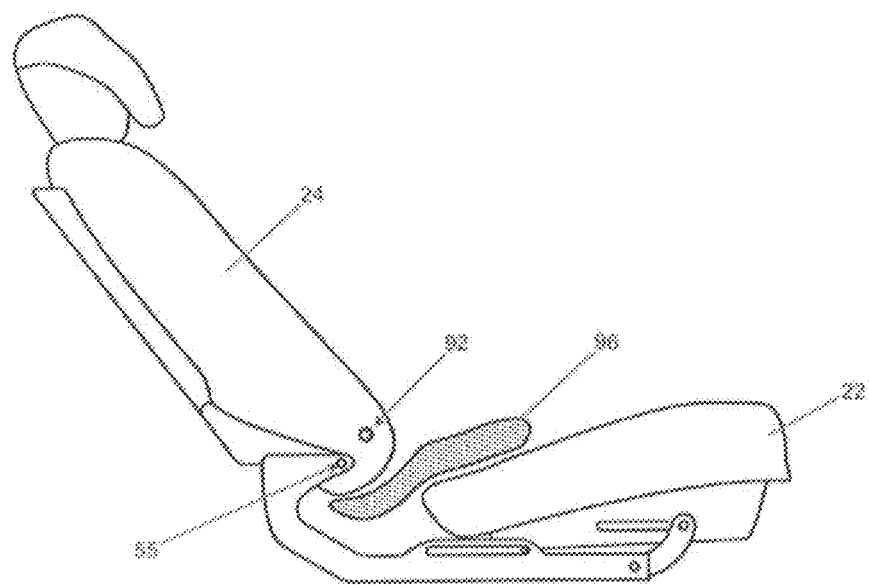

Using the pin-and-slot arrangement, the seat cushion 22 may be moved forward relative to the lower support structure 40 by rotating the support arms 64 in a forward direction, as shown in FIG. 7c. As noted above, this corresponds to the first mode of movement for the seat cushion 22.

The forward position of the seat cushion 22 provides further space—indicated by the shaded area 96 in FIG. 7c—for the squab 24 to pivot into. Without the forward sliding of the cushion 22, the cushion 22 would present an obstruction to pivoting movement of the squab 24. Accordingly, the shaded area 96 represents a first clash zone 96, in that if the cushion 22 is within the first clash zone 96, attempting to fold the squab 24 will cause a clash between the squab 24 and the cushion 22.

Figure 7D:
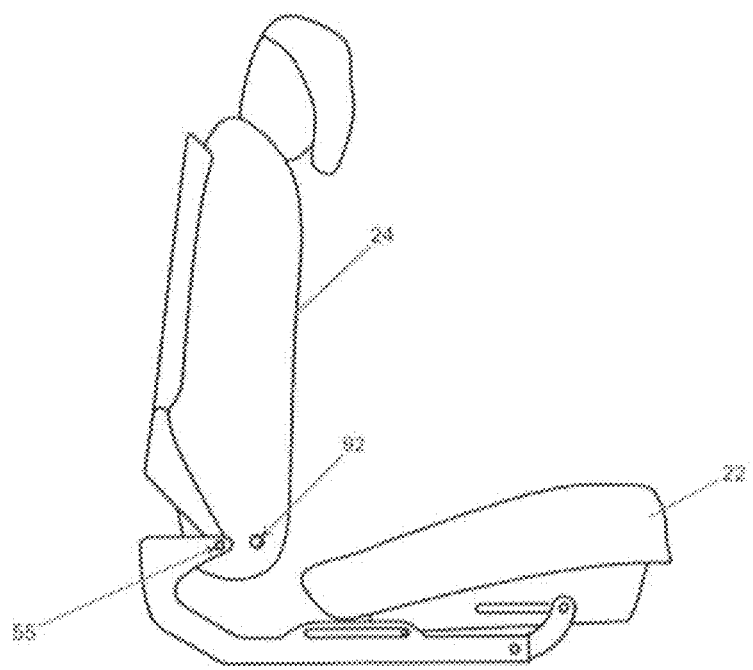
Figure 7E:
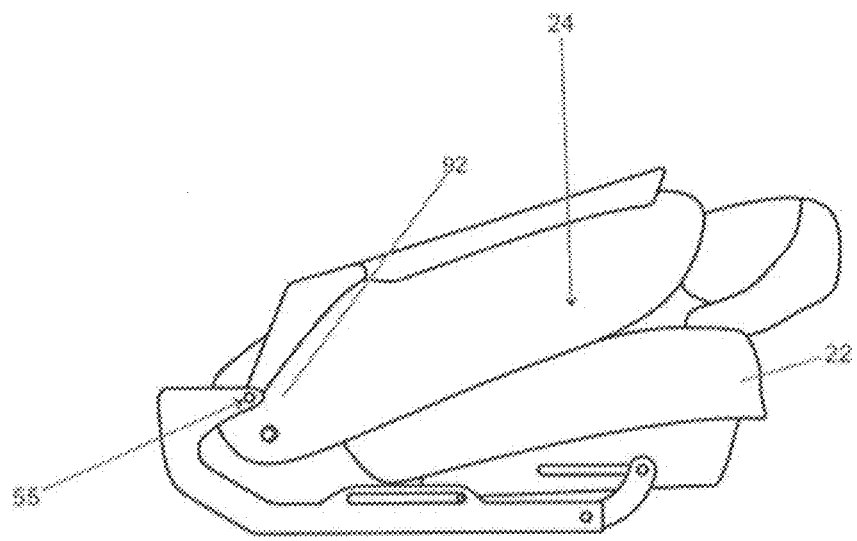

FIG. 7d illustrates the seat 16 and bulkhead assembly 34 at an intermediate stage between the unfolded configuration and the folded configuration as they pivot together around the pivotable joint 55, and FIG. 7e illustrates the components of the major portion of the bulkhead assembly 34 in the folded configuration once the folding operation completes. In the folded configuration, a portion of the squab 24 fills the shaded area 96 shown in FIG. 7c.

Figure 8:
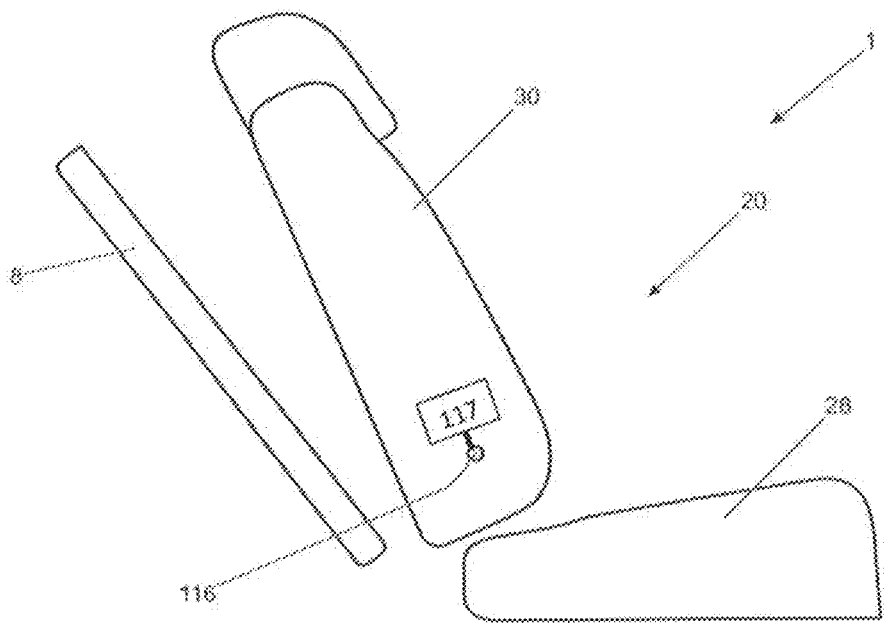
FIG. 8 is a side sectional view of an example of the rear seating arrangement of FIG. 1 in which the armrest is in a stowed configuration.
Figure 9:
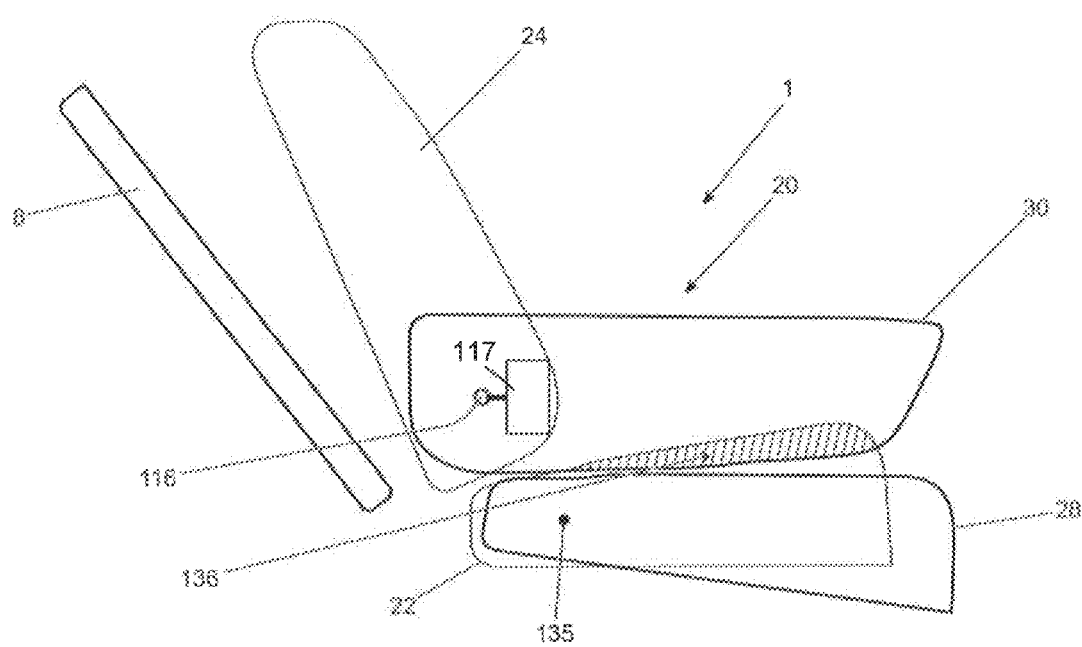
FIG. 9 corresponds to FIG. 8 but shows the armrest in a deployed configuration.
Figure 10:
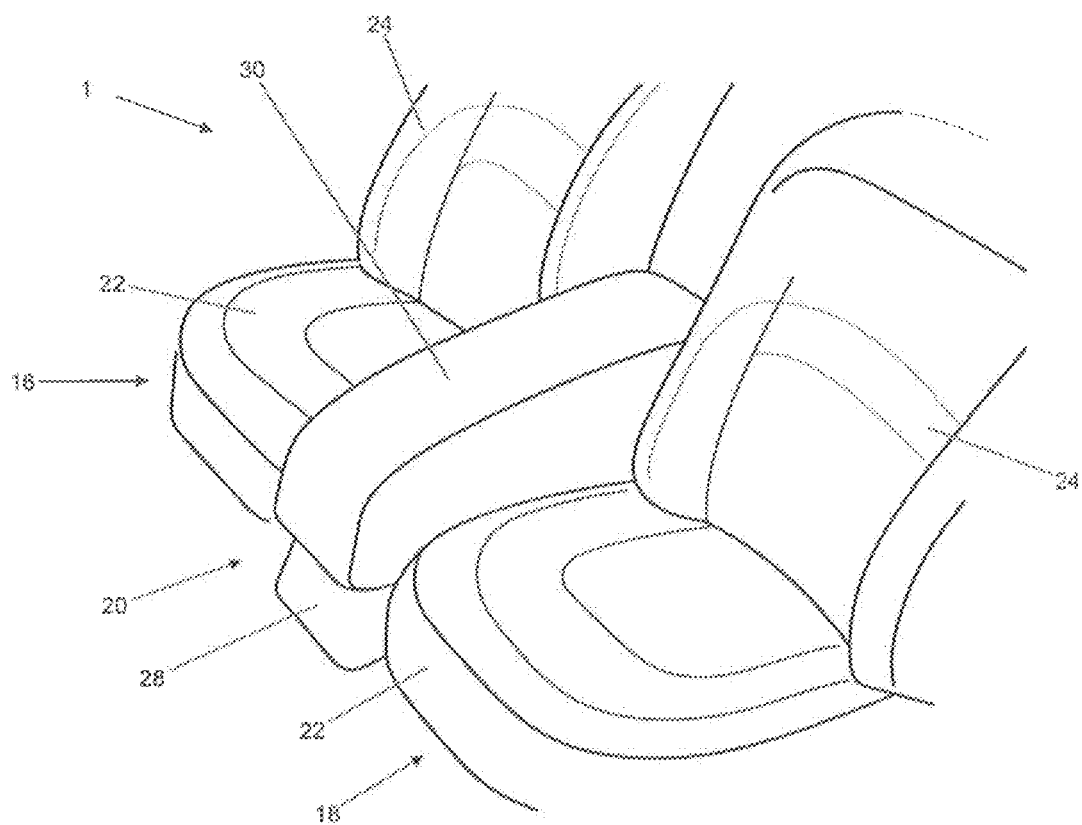
FIG. 10 is a perspective view of the rear seating arrangement shown in FIG. 9.

As FIGS. 8 to 10 illustrate, in some arrangements the central cushion 28 is moved as the armrest 30 repositions from the stowed configuration to the deployed configuration.

FIG. 8 shows a side view of an example of the central seat 20 of the seating arrangement 1 with the armrest 30 in the stowed configuration. The armrest 30 is mounted on a pivot 116 that enables the armrest 30 to pivot between the stowed configuration and the deployed configuration. In the stowed configuration, the armrest 30 and the central cushion 28 generally are aligned respectively with the squabs 24 and seat cushions 22 (shown in FIGS. 9 and 10) either side of the armrest 30 and central cushion 28, so that the central seat 20 may be used as a passenger seat.

FIGS. 9 and 10 show an example of the seating arrangement 1 with the armrest 30 in the deployed configuration. FIG. 9 is a side view of the central seat 20, whereas FIG. 10 is a perspective view that also shows the squabs 24 and seat cushions 22 of the first and second seats 16, 18 adjacent to the central seat 20.

The seating arrangement 1 in the illustrated embodiment is arranged to alter the position of the central cushion 28 as the armrest 30 switches between the stowed configuration and the deployed configuration. The central cushion 28 rotates about a central cushion pivot 135. Alternatively, the central cushion 28 may be mounted on a moveable mounting that is arranged to reposition the central cushion 28 as the armrest 30 switches between the stowed configuration and the deployed configuration.

The armrest 30 rotates forwards about the pivot 116 as it moves from the stowed configuration to the deployed configuration. At the same time, or previously, the central cushion 28 drops into a dipped position so that a recess is formed between the seat cushions 22, to receive the armrest 30, allowing the armrest 30 to overlap the seat cushions 22, which is illustrated by the hatched area 136, to achieve a comfortable armrest position, and which enables the visual appearance of an armrest that is fully integrated with the adjacent seats.

Such an integrated appearance of the present embodiment of the invention is best seen in FIG. 10. As shown, a portion of the armrest 30 is located between the seat cushions 22 of the first seat 16 and the second seat 18, which gives the appearance of the armrest 30 being integral with the seats 16, 18.

Figure 11:
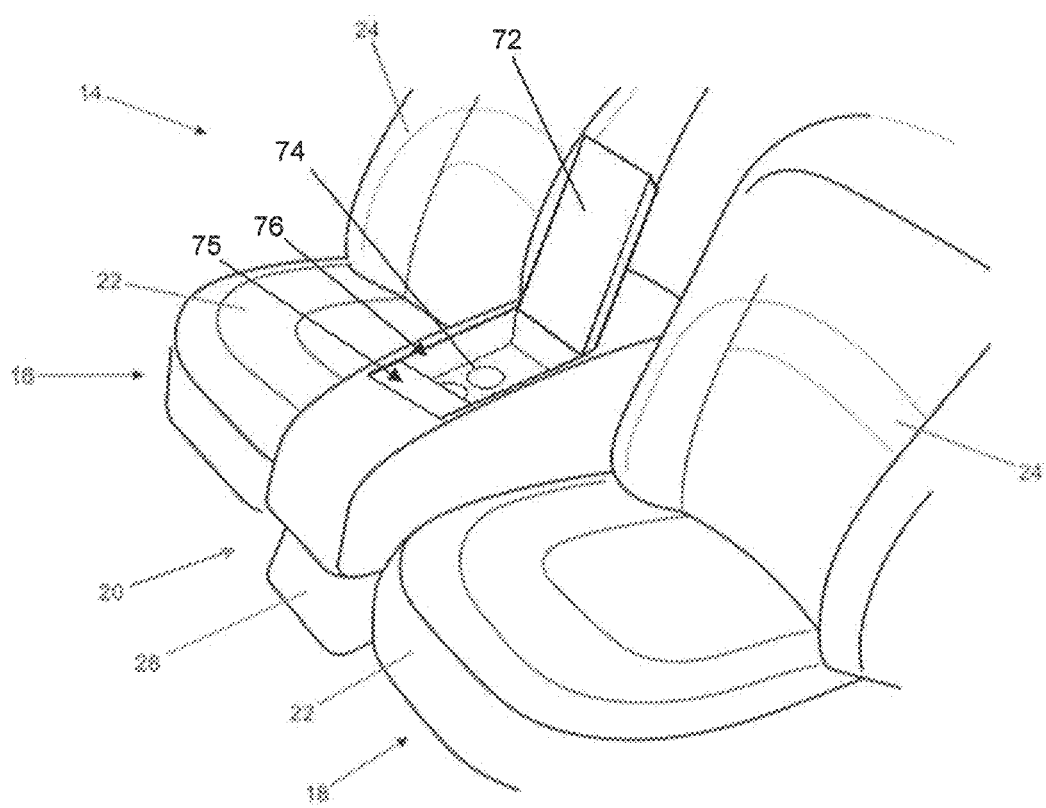
FIG. 11 corresponds to FIG. 10 but shows a lid of the armrest in an open configuration.

FIG. 11 shows an example of the armrest 30 in the deployed configuration and in an open configuration in which a lid 72 of the armrest 30 is open. This provides access to an internal compartment 76 defined within the armrest beneath the lid 72, which in the illustrated example comprises cup holders 74 defined by cylindrical recesses formed in a base of the compartment 76. To reveal the compartment 76, the lid 72 of the armrest 30 is pivoted from a closed configuration, in which the lid 72 is generally flush with an upper surface of the armrest 30, to a generally upright orientation as shown in FIG. 11, which defines an open configuration for the lid 72.

In the embodiment illustrated in FIG. 11, the armrest 30 further comprises a retractable cover 75 that can slide horizontally into a closed configuration across the cup holders 74 when they are not in use, and may be retracted into the body of the armrest 30 and into an open configuration when access to the cup holders 74 is required. Movement of the retractable cover 75 between its open and closed configurations may be powered by a retractable cover motor that is disposed within the armrest 30.

If an attempt is made to close the retractable cover 75 while a cup or another object is situated in one of the cup holders 74, the retractable cover 75 will meet with resistance as it engages the cup, or other object. This resistance may be detected as a pinch condition (e.g. indicative of an object being trapped between the moving retractable cover 75 and another component), in response to which movement of the retractable cover 75 may be cancelled and/or reversed automatically.

FIG. 12 shows an example of the second seat 18 of the seating arrangement 1 in a reclined configuration. In the reclined configuration, the squab 24 is pivoted rearward into engagement with the bulkhead 8, while the cushion 22 has been move forward using the first mode of movement so that it is positioned forward and slightly raised relative to its default configuration. This configuration of the squab 24 and the cushion 22 corresponds to that of FIG. 7c. However, in this case the configuration is not adopted as a precursor to folding, but represents a configuration designed to provide maximum comfort.

As FIG. 12 shows, the calf rest 27 comprises a support structure comprising pivotable arms 78 that are mounted and rotatable about a pivot 81 relative to the lower support structure 40 of the bulkhead assembly 34 of the second seat 18. The calf rest arms 78 support a calf rest cushion 80 that is linearly displaceable along the arms 78, so that the calf rest cushion 80 can be moved towards or away from the pivot 81 located beneath the cushion 22 of the second seat 18. Moving the calf rest cushion 80 away from the pivot 81, and thus away from the seat cushion 22, is hereafter referred to as extending the calf rest 27, whereas pivoting the calf rest arms 78 shall be referred to as tilting or pivoting the calf rest 27.

When the second seat 18 is in such a reclined configuration, the calf rest 27 is pivoted and extended to a deployed configuration as shown in FIG. 12, in which the calf rest cushion 80 is positioned to provide leg support for an occupant of the second seat 18. The process by which the calf rest is deployed is described in more detail below with reference to FIG. 14.

To accommodate deployment of the calf rest 27, as shown in FIG. 12 a front passenger seat 82 of the vehicle 6 may be moved to a folded configuration if unoccupied. The folded configuration for the front seat 82 generally corresponds to the folded configuration for a rear seat 16, 18, as described above with reference to FIG. 7e. Specifically, a squab 84 of the front seat 82 is pivoted forwards into engagement with a cushion 86 of the front seat 82.

A headrest 88 of the front seat 82 is shown in a default configuration in FIG. 12, but optionally the headrest 88 may tilt forwards to avoid impacting a dashboard of the vehicle 6.

Moving the front seat 82 into the folded configuration ensures that no part of the front seat 82 falls within a second clash zone 98, which is illustrated in FIG. 12 by dashed lines. The second clash zone 98 represents an area within which the calf rest 27 moves during its deployment, and in which a clash could therefore arise between the calf rest 27 and the front seat 82 if a component of the front seat 82 is located inside the second clash zone 98 during such deployment of the calf rest 27.

Although the front seat 82 shown in FIG. 12 is structurally similar to the seats 16, 18 of the rear seating arrangement 1, it should be appreciated that the front seat 82 may be constructed differently. In particular, although the front seat 82 is shown in FIG. 12 as having a bulkhead 100 and a squab 84, it is noted that the squab 84 and bulkhead 100 are not separable as for the seats 16, 18 of the rear seating arrangement 1. Thus, the bulkhead 90 merely acts as a protective back for the squab 84 of the front seat 82.

Figure 13:
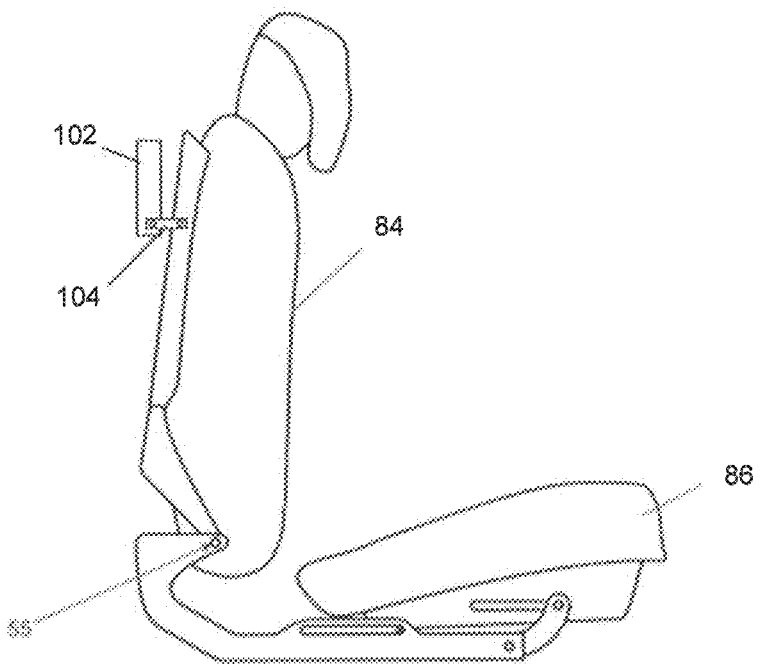
FIG. 13 is a side view of an example of a front seat of the vehicle in an intermediate stage of folding with a screen oriented according to an angle of the squab of the seat.

FIG. 12 also illustrates how a display device, for example an entertainment device such as a screen 102, mounted to the rear of the squab 84 of the front seat 82 tilts to compensate for folding of the front seat 82. As is clear from FIG. 12, although the squab 84 of the front seat 82 is pivoted forwards, the screen 102 is supported in an upright position. FIG. 13 shows the front seat 82 in a different configuration, in which the squab 84 is at intermediate stage of folding, and again the screen 102 is oriented generally vertically.

Adjusting the angle of the screen 102 relative to the squab 84 to maintain a substantially constant orientation relative to a floor of the vehicle 6 ensures that the screen 102 remains readily viewable by an occupant of the second seat 18 when the configuration of the front seat 82 is altered. Although the screen 102 is shown as generally vertical in both FIG. 12 and FIG. 13, alternatively the position of the screen 102 may be controlled so that it is oriented towards the headrest 26 of the second seat 18 at all times, thus optimising the viewing angle for an occupant of the second seat 18. In a further alternative, the orientation at which the screen 102 is maintained may be user-adjustable, for example through an interface such as an infotainment system.

The screen 102 is supported by a screen bracket 104 that is pivotable relative to the squab 84 of the front seat 82. The screen 102 may also pivot relative to the bracket for greater flexibility in movement, for example to enable linear movement of the screen 102 relative to the squab 84 of the front seat 82. Pivoting movement of the screen bracket 104 and/or the screen 102 relative to the screen bracket 104 is driven by one or more screen motors integrated within the screen bracket 104 and/or the squab 84 of the front seat 82.

A sensor 83 embedded within the front seat 82 provides a signal indicative of a position of the front seat squab 84. The position of the front seat squab 84 may comprise its orientation as well as its longitudinal position within the vehicle 6, noting that the position of the front seat 82 is adjustable fore-and-aft as is conventional.

The signal indicative of the position of the front seat 82 is passed to the control system 3, and is used to determine the correct position for the screen 102. The position of the screen 102 comprises its angle relative to the squab 84 of the front seat 82, and optionally a displacement of the screen 102 from the squab 84 of the front seat 82 in embodiments in which the screen bracket 104 is configured to move the screen 102 towards and away from the squab 84. Once the desired position is determined, the control system 3 operates the motors that control movement of the screen 102 and the screen bracket 104 to position the screen 102 as required.

In this way, the control system 3 operates to adjust the position of the screen 102 relative to the position of the front seat squab 84 according to a predefined relationship between the screen angle and the squab angle, to maintain an optimised viewing angle for an occupant of the second seat 18 as the front seat 82 is reconfigured.

Figure 14:
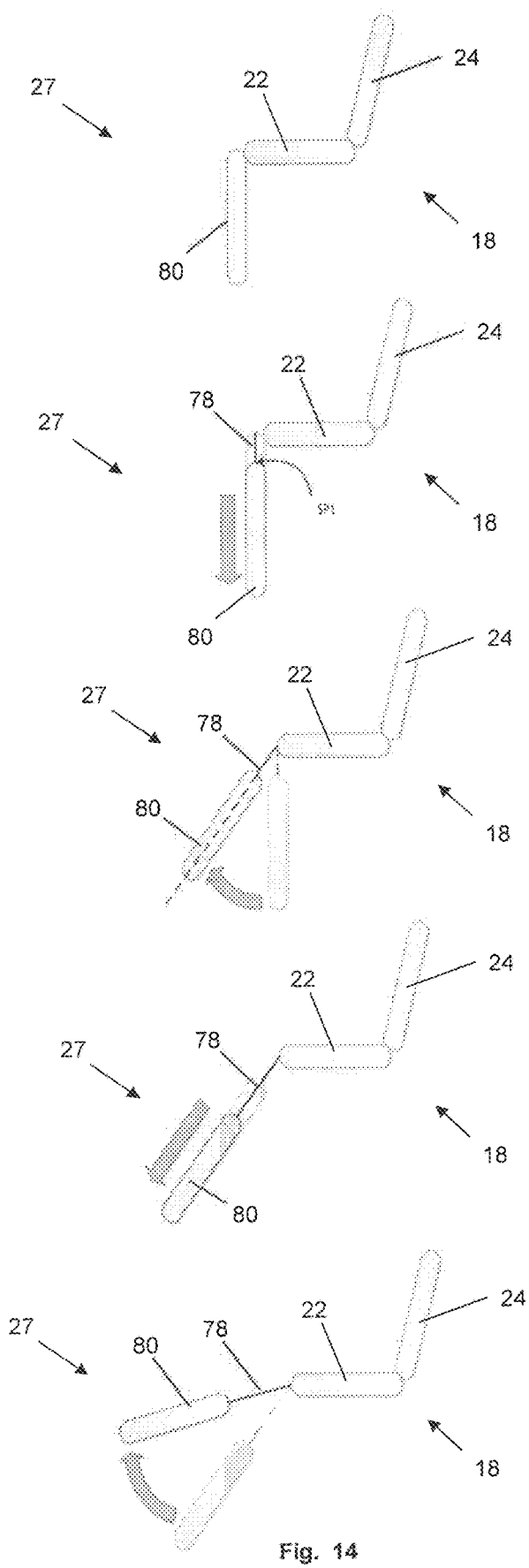
FIG. 14 shows an example of a first seat of the rear seating arrangement of FIG. 1 through a series of stages of deployment of a calf rest.
Figure 15:
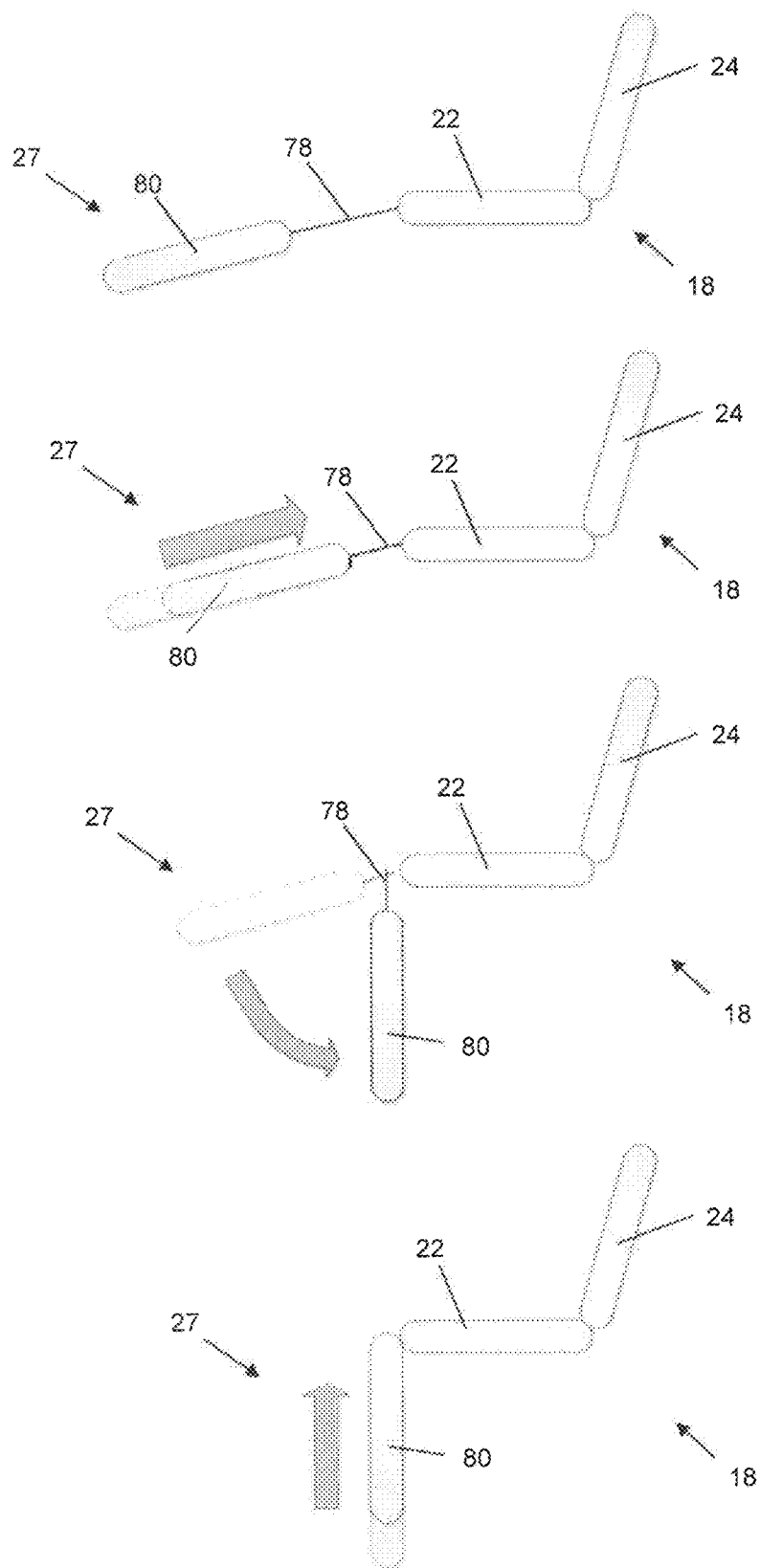
FIG. 15 corresponds to FIG. 14 but shows a retraction sequence for the calf rest.

FIGS. 14 and 15 schematically illustrate, respectively, example sequential stages of deployment and retraction movement of a calf rest 27 of the second seat 18.

In FIG. 14, a calf rest 27 is deployed from a stowed configuration, in which the calf rest 27 extends generally orthogonally to a floor of the passenger compartment 2 downwardly from a front edge of a seat cushion 22, to a deployed configuration and an extended configuration, in which the calf rest 27 provides support for the legs of a passenger occupying the second seat 18. In some embodiments deployment and extension of the calf rest 27 may be separate, independent operations. Thus, the deployed configuration and the stowed configuration refer only to the orientation of the calf rest 27, and not to the extent to which it has been extended.

In the deployed configuration, the calf rest 27 is inclined by, for example, approximately 15° relative to a horizontal plane, whereas in the stowed configuration the calf rest 27 extends, for example, generally vertically downwardly from the front edge of the seat 18.

When the calf rest 27 is extended, the calf rest cushion 80 is displaced away from the seat 18 by linear movement along the calf rest arms 78 that support the calf rest cushion 80, so that the calf rest cushion 80 may be located below the calves of the passenger's legs for maximum comfort.

It may not be possible to extend the calf rest 27 to its maximum extent while it is in the stowed configuration, as attempting to do so might result in the calf rest cushion 80 impacting the floor of the passenger compartment 2. Conversely, extending the calf rest 27 after it has been raised to the deployed configuration, and while therefore potentially supporting the passenger's legs, may cause discomfort to the passenger. Accordingly, the calf rest 27 may be deployed and extended in stages. FIG. 14 shows one of many possible implementations.

In a first stage, shown uppermost in FIG. 14, the calf rest 27 is in the stowed configuration. When deployment of the calf rest 27 is requested by the user, for example by pressing a button in a user interface panel of the adjacent vehicle door, the calf rest cushion 80 moves downwardly on the calf rest arms 78 into a first, intermediately extended position, in which the calf rest 27 is extended without impacting the floor of the passenger compartment 2. This step is shown as the second stage of FIG. 14, and reduces any additional extension that may be performed once the calf rest 27 has been raised, in turn minimising any discomfort to the user. In some embodiments, this first position may be achieved by extending the calf rest 27 as far as possible without impacting the floor of the passenger compartment to minimize any further subsequent extension.

It is also noted that, when the calf rest 27 is in the stowed configuration, the calf rest cushion 80 may be positioned beneath the cushion 22 of the second seat 18, and may engage the underside or front edge of the cushion 22. Accordingly, the step of extending the calf rest 27 downwardly before beginning to tilt the calf rest 27 moves the calf rest cushion 08 out of engagement with the seat cushion 88 and therefore avoids a clash between the two during subsequent pivoting of the calf rest arms 78.

Next, the calf rest arms 78 pivot forwardly towards a second position in which they are inclined at, for example, approximately 45° with respect to the horizontal, as shown at the third stage of FIG. 14. At this point, the calf rest cushion 80 may not yet have come into contact with the passenger's legs, and in some embodiments there may be sufficient room remaining in front of the calf rest 27 for a passenger with legs of at least average length to maintain their feet on the floor of the passenger compartment 2 comfortably. In this second position it is envisaged that the calf rest 27 does not yet support the passenger's legs, and thus further extending the calf rest 27 at this point will cause minimal discomfort. Moreover, with the calf rest arms 78 oriented at this angle, the calf rest 27 may be further extended without risk of impact with the passenger compartment floor.

The calf rest 27 may then complete its extension at the fourth stage by moving to a third position, before finally continuing the forward pivoting movement of the arms 78 to bring the calf rest 27 to the deployed configuration at the fifth stage.

As already noted, the sequence shown in FIG. 14 is provided as an example only, and many variations are possible. It is also possible to rotate the arms 78 simultaneously with extending the calf rest 27, so that deployment and extension occur in a single continuous movement.

FIG. 15 shows the reverse operation, namely a retraction sequence in which the calf rest 27 moves from a deployed and extended configuration to a retracted state in the stowed configuration. In contrast with extending the calf rest 27 while supporting a passenger's legs, retracting the calf rest cushion 80 towards the first seat 16 while supporting legs is considered acceptable in terms of comfort. Therefore, in the example illustrated in FIG. 15, the retraction operation is slightly simpler than the deployment operation shown in FIG. 14, as it comprises fewer stages.

Specifically, the first stage of the retraction operation shown in FIG. 15 has the calf rest 27 in the deployed and extended configuration in which it finished at the end of the deployment operation of FIG. 14. Next, at the second stage the calf rest cushion 80 is retracted towards the second seat 18, stopping slightly short of reaching the top of the calf rest arms 78 to avoid impacting the cushion 24 of the second seat 18, which might interfere with rotation of the calf rest arms 78.

At the third stage, the calf rest arms 78 are pivoted downwardly to return to a vertical orientation, noting that the calf rest cushion 80 has been sufficiently retracted in the second stage to avoid collision with the floor. The retraction operation then completes at the fourth stage by drawing the calf rest cushion 80 up on the calf rest arms 78 to return to its original position below the cushion 24 of the second seat 18, corresponding to the stowed configuration.

In summary, the rear seating arrangement 1 may comprise a folding bulkhead 8, reclining seats 16, 18, deployable calf rests 27, a deployable armrest 30 and a deployable ski-hatch 29. Positioning the components of the seating arrangement 1 in any of the above described configurations is automated using a system of motors and associated mechanisms and is controlled by the control system 3.

Figure 16:
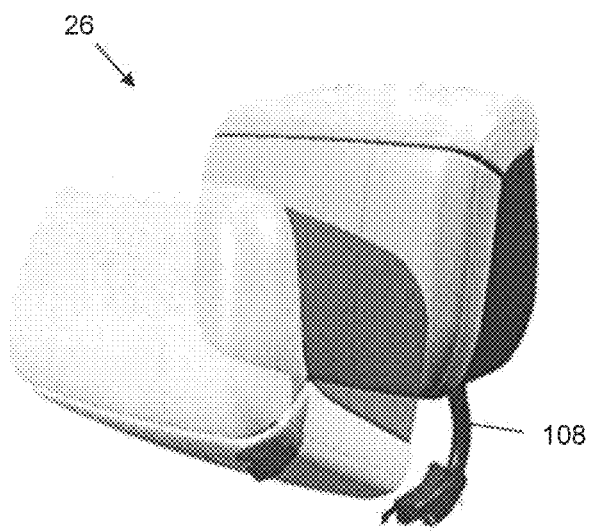
FIG. 16 is a perspective view of an example of a headrest of the rear seating arrangement of FIG. 1.
Figure 18:
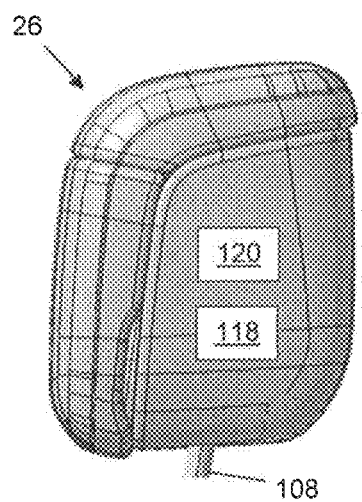
FIG. 18 is a cross-sectional view of the headrest of FIG. 16.
Figure 17:
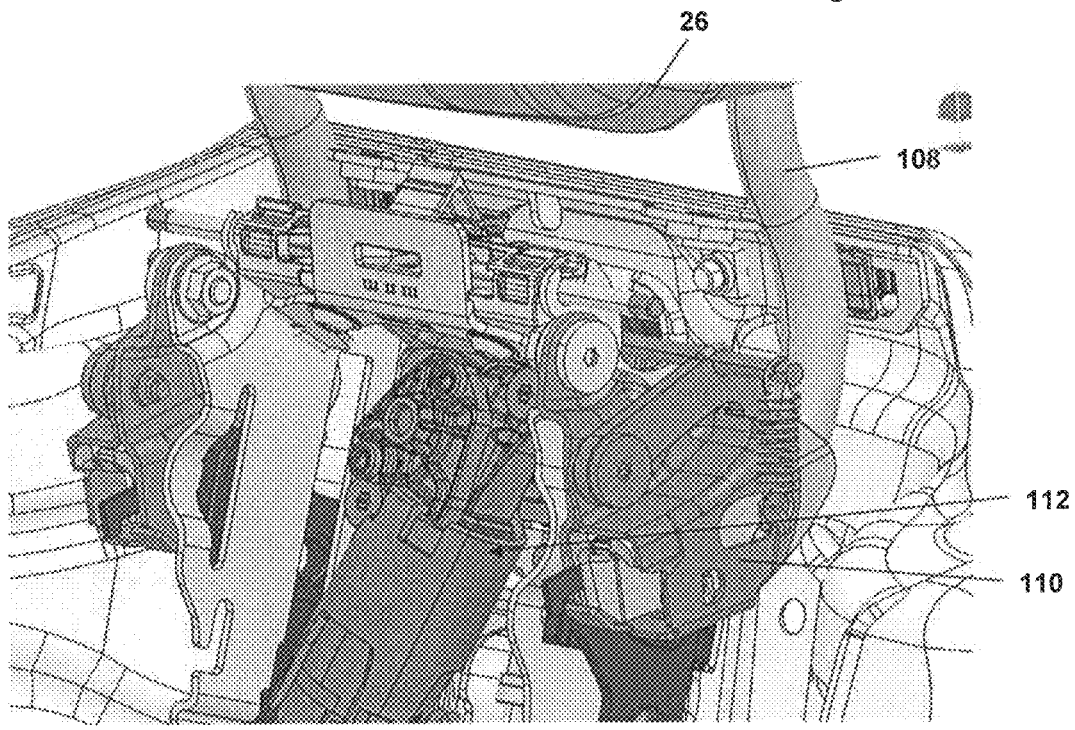
FIG. 17 is a perspective, cut-away view of an interface between the headrest of FIG. 16 and a squab of the rear seating arrangement of FIG. 1, showing internal features of the squab.

FIGS. 16 to 18 show an example of a headrest 26 of the rear seating arrangement 1 in more detail. As FIG. 16 shows, the headrest 26 is supported by a pair of headrest supports in the form of curved headrest rods 108. When the headrest 26 is in a generally upright configuration, the headrest rods 108 extend downwardly initially from the headrest 26, and then curve in a generally circular arc towards a generally horizontal inclination at their lowest extent. FIG. 17 shows the ends of the headrest rods 108 being received within sleeves 110 residing inside a squab 24 of a rear seat, the first seat 16 in this example.

Returning to FIG. 16, the headrest 26 may be tilted between the generally upright configuration and a downwardly facing folded configuration, for example to enable the headrest 26 to be folded out of the way when the seat 16 is moved into a folded configuration. Movement of the headrest 26 between the upright and folded configurations may be driven by a headrest tilt motor 112 embedded in the squab 24, which acts to push the headrest rods 108 outwardly from the squab 24, causing the headrest 26 to tilt forwardly due to the curve of the headrest rods 108. Tilting of the headrest 26 may thus be controlled by the control system 3 in response to requests from a user, as shall be described in more detail later.

In addition to tilting movement, the headrest 26 may move both vertically and horizontally on the headrest rods 108, offering further flexibility in repositioning of the headrest 26 for a user's comfort. Vertical and horizontal movement of the headrest 26 on the headrest rods 108 is effected by a headrest vertical motor 118 and a headrest horizontal motor 120 respectively, which are embedded within the headrest 26 as shown in FIG. 18. In turn, operation of the headrest motors 118, 120 may be controlled by the control system 3 in response to user requests.

Electrical power is delivered to the headrest vertical motor 118 and the headrest horizontal motor 120 through wiring routed inside one of the headrest rods 108. In turn, the headrest rod 108 containing the wiring comprises an electrical terminal that connects to a complementary terminal within the sleeve 110 of the squab 24 within which the headrest rod 108 is received. Accordingly, when the headrest rod 108 engages its respective sleeve 110, the headrest vertical motor 118 and the headrest horizontal motor 120 are electrically connected to the squab 24, and in turn to the control system 3, and may therefore be driven according to user requests.

The detailed operation of the mechanisms for vertical, horizontal and tilting movement of the headrest 26 are already known and are not the subject of this invention, and so shall not be described further here.

It is noted that the headrest 26 may be removed from the squab 24 manually when the headrest 26 is tilted into its folded configuration. To remove the headrest 26, a user must lift the headrest 26 to withdraw the headrest rods 108 from the squab 24 while pressing a release button on the squab 24.

It is undesirable to drive the headrest tilt motor 112 if the headrest 26 is absent, because driving the motor 112 under such circumstances may make subsequent reinsertion of the headrest rods 108 difficult and therefore inhibit reinstallation of the headrest 26. Accordingly, when the control system 3 receives a request to drive the headrest tilt motor 112 to tilt the headrest 26, it is desirable to ascertain first whether the headrest 26 is present.

Prior art arrangements comprise microswitches within the squab 24 to detect the presence of the headrest rods 108 and thereby prevent inappropriate driving of the headrest tilt motor 112. However, this approach has been found to be unreliable.

Accordingly, embodiments of the invention take a different approach, in which the presence of the headrest 26 is determined using a plausibility check in which the control system 3 attempts to drive the headrest horizontal motor 120 and/or the headrest vertical motor 118 located within the headrest 26, and measures a current flow at the electrical terminal for the, or each, motor 118, 120 to determine whether the headrest 26 is present or absent. This process is described in more detail below with reference to FIG. 30, but it is noted at this stage that this approach beneficially allows the microswitches to be dispensed with, whilst also providing a more reliable indication of whether the headrest 26 is present.

The underlying structure and mechanisms of the seating arrangement that enable the above described automated reconfiguration are not the subject of this invention and so are not described in detail, to avoid obscuring the invention. Examples of seating assemblies having these capabilities are described in detail in some of the Applicant's earlier applications published as GB2539501, WO 2016/202732 and WO 2016/202733.

Figure 19:
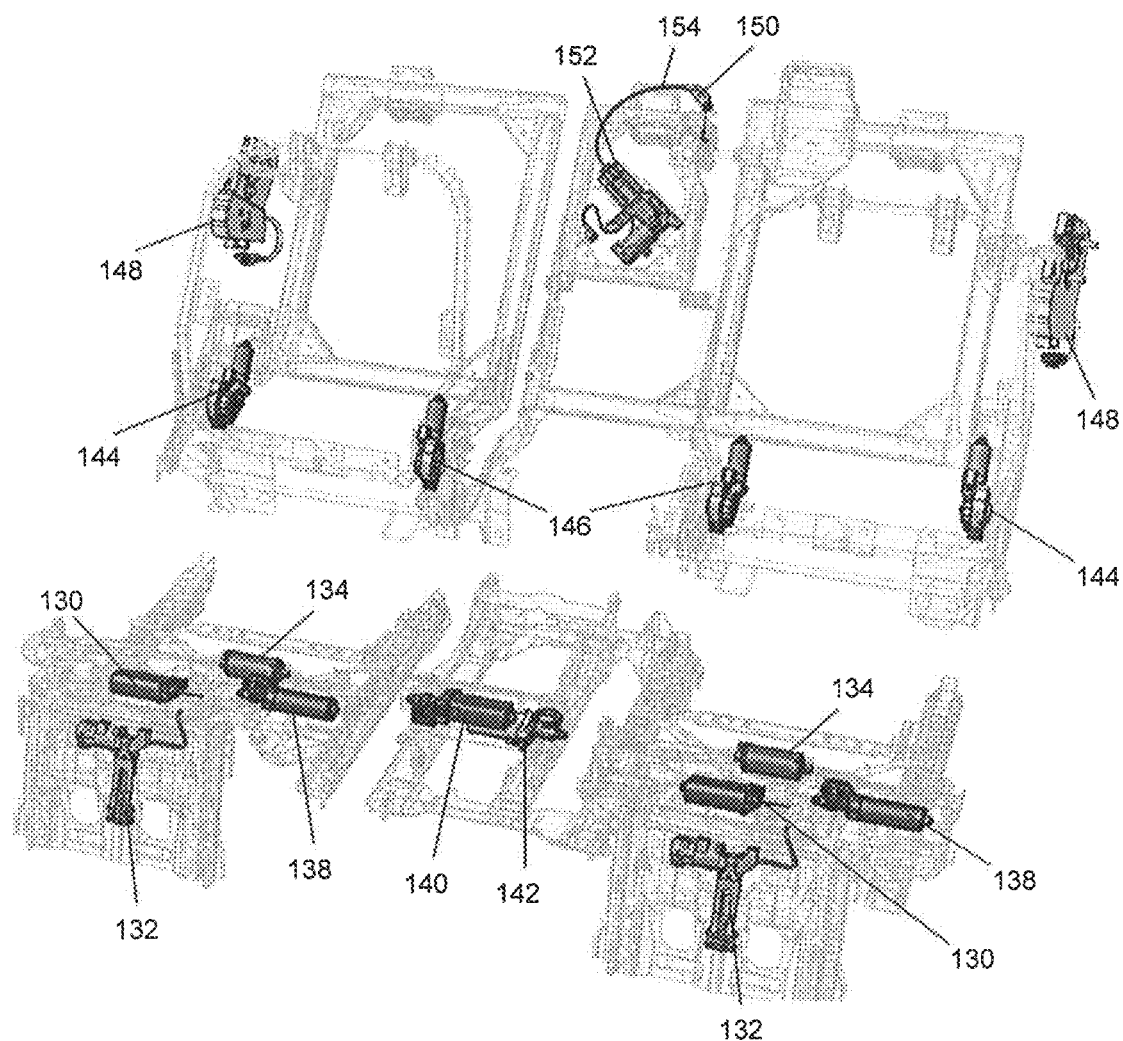
FIG. 19 is a schematic perspective view of an example of the rear seating arrangement of FIG. 1 showing a motor system used to power movement of components of the seating arrangement.

However, FIG. 19 schematically illustrates an example set of motors incorporated into the seating arrangement 1, to provide an overview of at least some of the means by which the seating arrangement 1 is reconfigured.

The set of motors comprises a pair of calf rest arm motors 130, a respective one for each calf rest. The calf rest arm motors 130 are capable of providing rotational force for effecting rotation of the calf rest arms 78 between the deployed and stowed configurations. Each calf rest arm motor 130 is coupled to the arms 78 of its respective calf rest 27 by suitable linkages (not shown).

A respective calf rest cushion motor 132 is positioned beneath the cushions 22 of the first and second seats 16, 18. Each calf rest cushion motor 132 is coupled to its respective calf rest 27 through suitable linkages to drive linear movement to extend the calf rest cushion 80 away from the cushion 22 of the respective seat 16, 18.

Two further motors are installed beneath each of the cushions 22 of the first and second seats 16, 18. These comprise cushion slide motors 134, which are configured to drive fore-and-aft sliding movement of the cushions 22 in the second mode of movement, and cushion comfort motors 138 that operate to rotate the support arms 64 to drive the cushion 22 in the first mode of movement.

First and second central motors 140, 142 are disposed beneath the central cushion 28. The first central motor 140 is configured to drive the central cushion in a 'bunny hop' motion to raise and reposition the central cushion 28 when the armrest 30 is stowed. The second central motor 142 provides the opposite function, to drive a dip-down movement of the central cushion 28 to move the central cushion 28 into its dipped position when the armrest 30 is being deployed. In some alternative embodiments, the functionality of the first and second central motors 140, 142 could alternatively be provided by a single motor.

The set of motors further comprises a pair of squab motors 144, a respective one for each squab 24, the squab motors 144 being arranged to induce forwards or backwards pivoting movement of the squabs 24 to move between the folded, reclined and default configurations.

Similarly, a pair of bulkhead motors 146 is included to exert respective forces on each of the bulkheads 8 to rotate them between the folded, reclined and default configurations. The bulkhead motors 146 are identical to the squab motors 144 in this example although may differ in other implementations, for example if differing levels of torque are required to fold the squabs 24 and the bulkhead 8.

In the upper corners of the seating arrangement 1, each seat 16, 18 comprises a respective bulkhead actuator 148 that is operable to lock the bulkhead 8 in place in its default configuration when activated. This ensures that each bulkhead 8 is tightly retained when the seating arrangement 1 is in the default configuration, providing secure bulkheads 8 between the passenger compartment 2 and the loadspace 4 and a secure foundation for movement of the squabs 24, as well as minimising vibration, and in turn noise, arising from the bulkheads 8.

Deployment of the ski-hatch 29 is somewhat simpler than for other components of the seating arrangement 1, as the ski-hatch 29 is small and lightweight in comparison to the squabs and calf rests, for example. Accordingly, the ski-hatch 29 is not moved by electric motors directly, but instead is spring-loaded and held in its closed, upright configuration by a ski-hatch actuator 150. The ski-hatch actuator 150 is controlled by a ski-hatch motor 152 that applies tension to a wire 154 to move the ski-hatch actuator 150 to its open configuration. The ski-hatch actuator 150 returns to a closed state under spring-loading when the ski-hatch motor 152 releases tension from the wire 154.

Moving the ski-hatch actuator 150 to the open state releases the ski-hatch 29, which causes the ski-hatch 29 to pivot and deploy forward under its spring-loading into its open configuration. Once the ski-hatch 29 is deployed, the ski-hatch motor 152 releases tension from the wire 154 to return the ski-hatch actuator 150 to the closed state, so that it is ready to latch the ski-hatch 29 when it is subsequently stowed manually.

It is noted that the armrest 30 is omitted from FIG. 19; however the armrest motor 117 that drives pivoting movement of the armrest 30 is schematically illustrated in FIG. 9.

Figure 20:
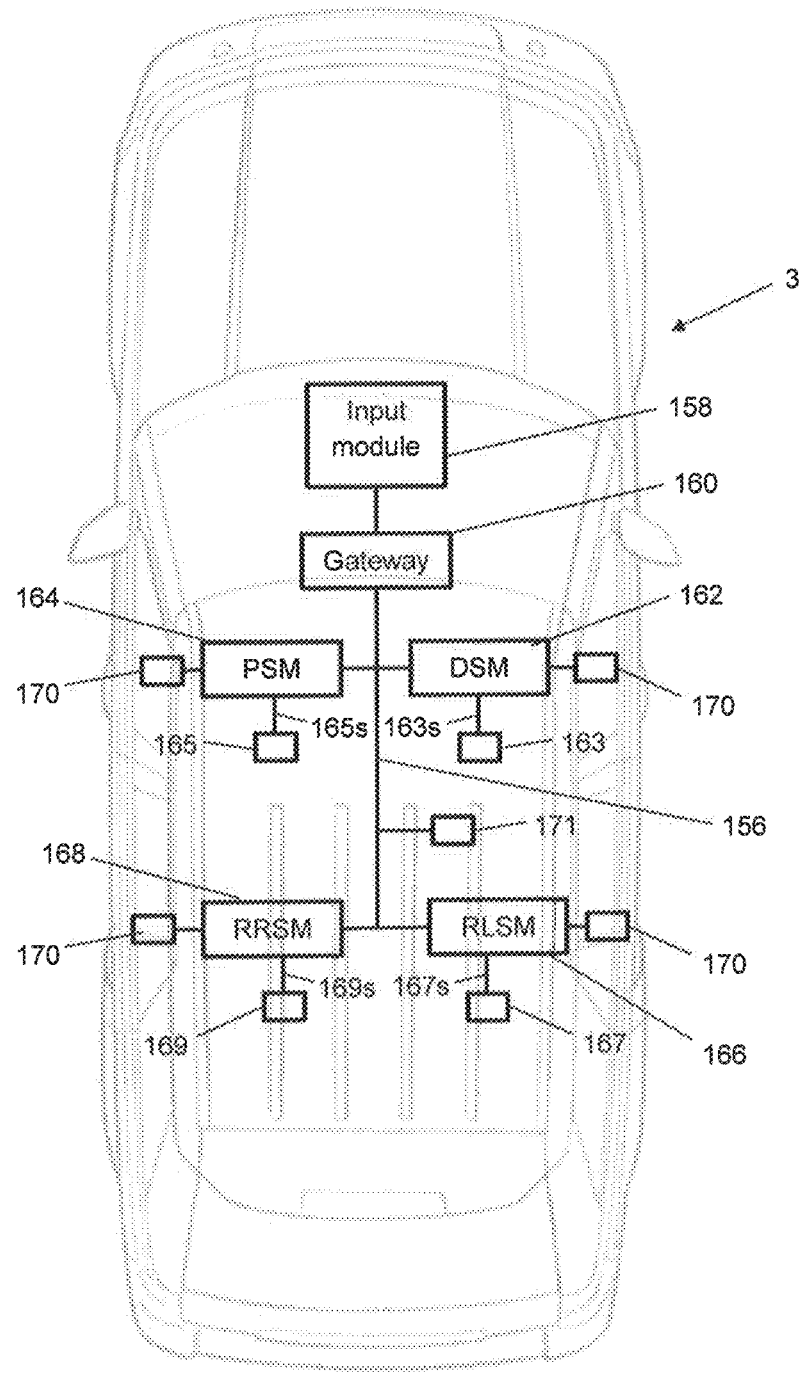
FIG. 20 is a schematic illustration of an example of a control system used to operate the rear seating arrangement of FIG. 1.

FIG. 20 illustrates schematically and in simplified form an example of the control system 3 for controlling operation of the set of motors shown in FIG. 19, and in turn movement of components of the seating arrangement 1.

In the illustrated example, the control system 3 comprises four control modules that are interconnected through a communications bus such as a conventional vehicle CAN bus that defines a vehicle network 156.

Also residing on the network 156 is an input module 158 that enables a user to input control requests, for example in the form of a screen of an infotainment system. The input module 158 may communicate with the vehicle network 156 through a gateway 160, as is conventional. The input module 158 may be operable by, for example, the driver of the vehicle 6, for example a chauffeur, such that the driver may reconfigure any seat within the vehicle 6 from the driver seat.

In the illustrated example, each control module is associated with, and may be physically located within, a respective seat of the vehicle 6. The four control modules in the illustrated example comprise: a driver seat module (DSM) 162 associated with the driver's seat; a passenger seat module (PSM) 164 associated with the front passenger seat 82; a rear left seat module (RLSM) 166 associated with the first seat 16; and a rear right seat module (RRSM) 168 associated with the second seat 18.

Each control module 162, 164, 166, 168 is in communication with a respective local switch pack 170, again through the vehicle network 156. Each switch pack 170 comprises a set of switches, for example installed in a door nearest to the respective seat, which enables an occupant of the seat to input control requests to operate the relevant motors of the seating arrangement and thereby move the seat as desired.

Each of the control modules 162, 164, 166, 168 has responsibility for movements of its respective seat in response to request signals received through the vehicle network 156. Each request signal received may be generated either by user interaction with the input module 158 or with a switch pack 170, or by one of the other control modules. For example, the PSM 164 may receive a request to fold forwards from the RRSM 168 during a reclining operation.

Each control module also has access to signals 163$s$, 165$s$, 167$s$, 169$s$, generated by sensors illustrated generally at 163, 165, 167, 169, which indicate the status of components of the vehicle 6. Such sensors 163, 165, 167, 169 may be attached to or embedded within respective components of the vehicle 6, and many be arranged to generate signals 163$s$, 165$s$, 167$s$, 169$s$ indicative of, for example, any one or more of: a position of the component; a load applied to the component; engagement of the component with another component of the seating arrangement; and a presence of the component in the seating arrangement. For example, signals indicative of the presence of objects on the cushions 22, 28 of the first, second or central seats 16, 18, 20 may be generated from sensors embedded within the cushions 22, 28 of the first, second or central seats 16, 18, 20 and transmitted to the control modules 162, 164, 166, 168 through the vehicle network 156.

The signals 163$s$, 165$s$, 167$s$, 169$s$ may comprise signals indicative of a failure of the component to operate, for example indicative of an undercurrent reading.

In addition, each control module may transmit signals indicating the status of components under its control to the other control modules.

Accordingly, each control module has oversight of the status of various other vehicle components, and can take this into account when implementing control requests.

The control modules 162, 164, 166, 168 of the example shown in FIG. 20 each operate according a respective set of algorithms defined by a computer program product stored in a non-transitory computer-readable medium, such as indicated generally at 171. In the illustrated embodiment, the computer-readable medium 171 is embodied as a readable memory module hosted on the vehicle network 156, which each control module 162, 164, 166, 168 has access to. In other embodiments, each control module 162, 164, 166, 168 may be provided with an integrated local memory module on which a respective computer program product is stored to control operation of the control module 162, 164, 166, 168.

In the illustrated example, the RLSM 166 controls operation of the cushion slide motor 134, the squab motor 144, the calf rest arm motor 130 and the calf rest cushion motor 132 installed in the first seat 16. Furthermore, the RLSM 166 controls the headrest tilt motor 112 embedded within the squab 24 of the first seat 16, as well as the headrest horizontal motor 120 and the headrest vertical motor 118 of any headrest 26 that is fitted to the squab 24 of the first seat 16.

Similarly, the RRSM 168 controls operation of the cushion slide motor 134, the squab motor 144, the calf rest arm motor 130, the calf rest cushion motor 132 and the headrest tilt motor 112 installed in the second seat 18, as well as the headrest horizontal motor 120 and the headrest vertical motor 118 of any headrest 26 that is fitted to the squab 24 of the second seat 18.

In addition, the RLSM 166 and the RRSM 168 may each have responsibility for components beyond those associated with their respective seat.

For example, the RRSM 168 may control the bulkhead motor 146 of the second seat 16 as well as the first and second central motors 140, 142 and the armrest motor (not shown in FIG. 19), to control folding and unfolding of the major portion 17 of the seating arrangement 1. To distribute control responsibility across the system, the RLSM 166 may control operation of the bulkhead motor 146 of the bulkhead minor portion 19a, and also the ski-hatch actuator 150 to operate the ski-hatch 29.

Furthermore, the RLSM 166 and the RRSM 168 may each control operation of the bulkhead actuator 148 associated with the respective seat 16, 18.

The RLSM 166 and the RRSM 168 transmit status updates indicating the status of each motor under its control to the vehicle network 156, to be read by the other control modules.

As already noted, embodiments of the invention recognise that movement of the elements of the seating arrangement 1 must be controlled carefully, to avoid collisions between components and to avoid trapping objects. Various movement operations of individual components of the seating arrangement 1 are now described with reference to FIGS. 21 to 31.

Before considering those operations specifically, however, it is noted that, in general terms, embodiments of the invention avoid problems during movement by checking the status of other vehicle components before movement commences. This provides a sophisticated, pre-emptive approach to managing hazards to movement, unlike prior art arrangements that must rely on feedback relating to pinching or other problems after movement begins. The result is an intelligent control system 3 that optimises operation of the seating arrangement 1.

Figure 21:
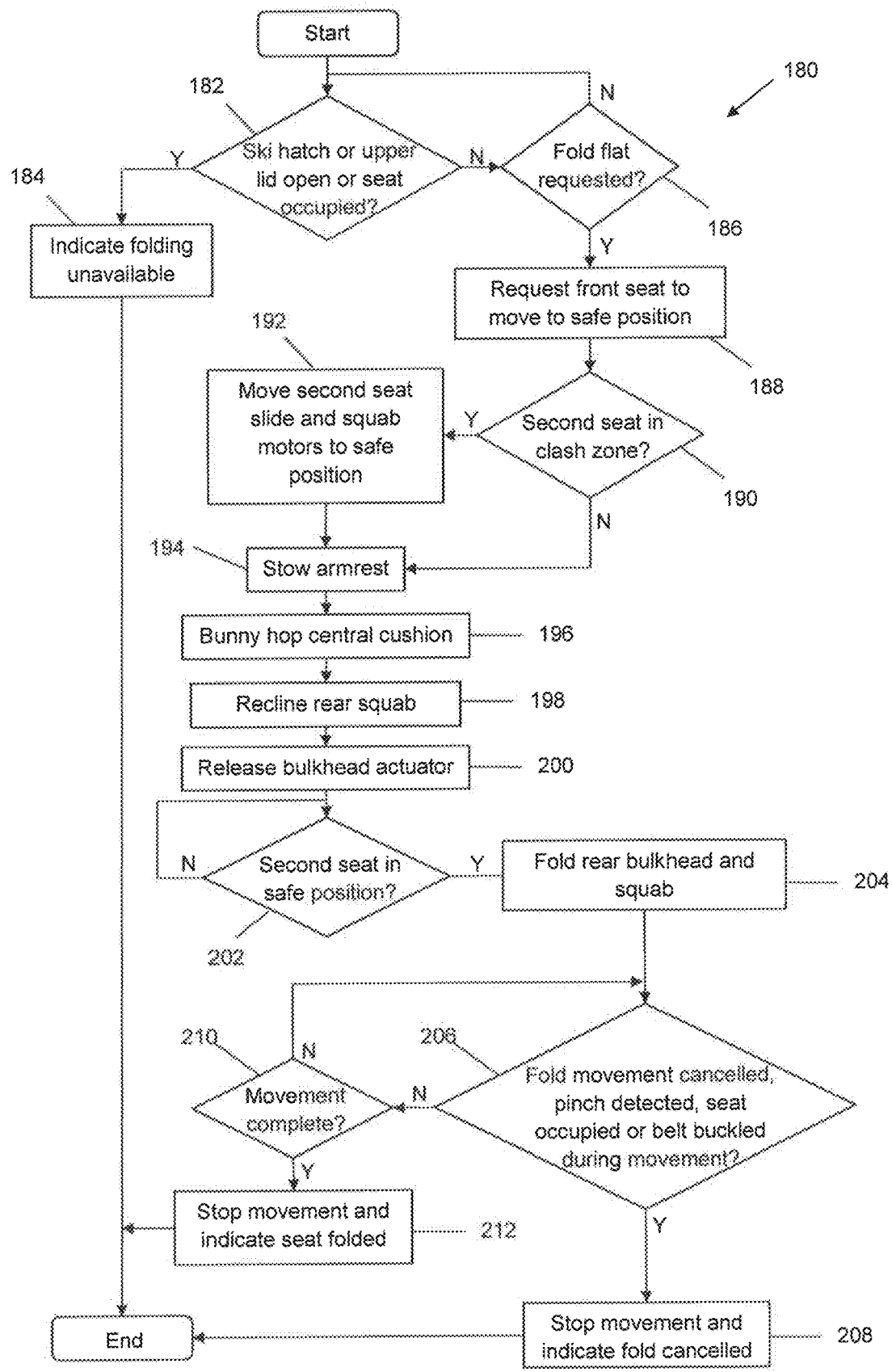
FIG. 21 is a flow diagram showing a process according to an embodiment of the invention for folding the seats of the rear seating arrangement of FIG. 1.
Figure 22:
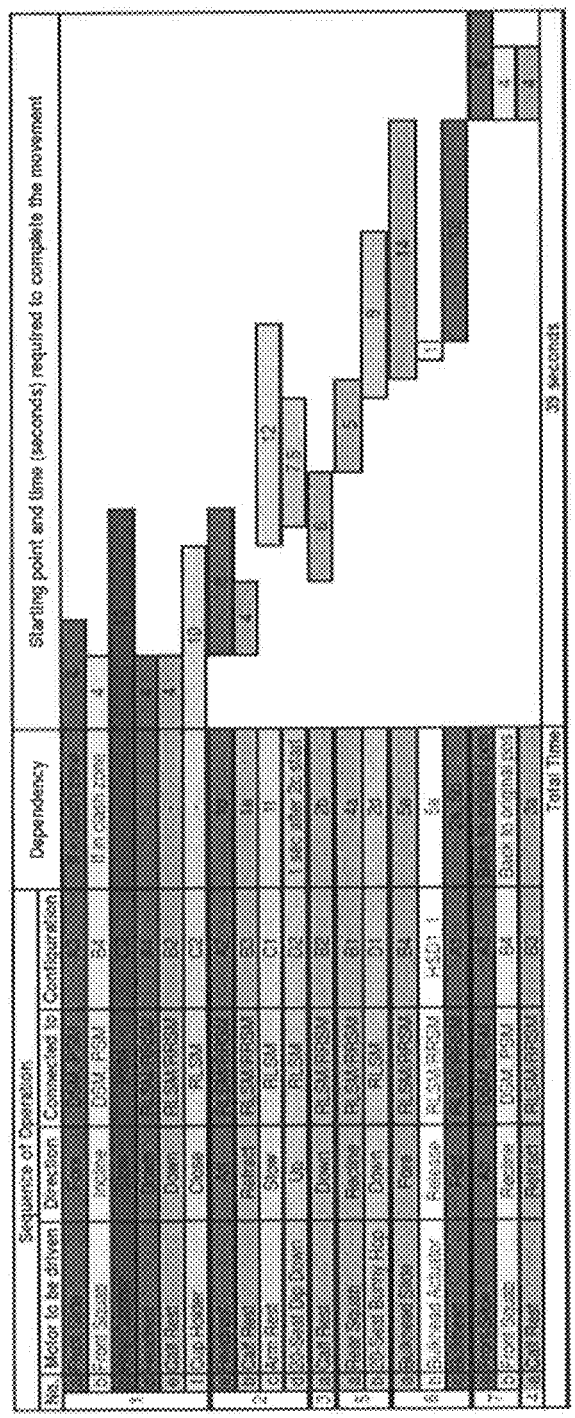
FIG. 22 is a Gantt chart showing steps of the process of FIG. 21.

FIG. 21 shows an example of a folding process 180 for folding the second seat 18 of the seating arrangement 1, together with its associated portion of the bulkhead 8. FIG. 22 generally corresponds to FIG. 21, but represents steps of the folding process 180 in a Gantt chart to illustrate an example of possible timings of the sequence. It is noted that FIG. 22, unlike FIG. 21, comprises steps for stowing the calf rest 27 as part of the folding procedure; the process 180 shown in FIG. 21 assumes that the calf rest 27 is already stowed. The following description refers to the process 180 shown in FIG. 21 specifically, but the skilled reader will readily understand the Gantt chart of FIG. 22 and be able to relate it to the steps of the process 180 outlined below.

As noted above, this folding process 180 is controlled by the RRSM 168 in response to a request generated by user interaction with the input module 158 or with a switch pack 170, for example the switch pack 170 installed in the vehicle door adjacent the second seat 18, although the process may be controlled from any of the switch packs 170.

In the following example, it is assumed that the seating arrangement 1 begins in the default configuration with the armrest 30 deployed and the calf rest 27 stowed.

In the illustrated example, the folding process 180 begins with the RRSM 168 performing at step 182 pre-checks to determine whether any of the following conditions is true:

- the ski-hatch 29 is deployed, as indicated by a microswitch (not shown) associated with the ski-hatch 29, via the RLSM 166, for example;
- the lid 72 of the armrest 30 is open, for example with reference to a signal generated by a sensor 169 installed in the armrest 30;
- the second seat 18 is occupied, for example by comparing a load applied to the seat cushion 22 of the second seat 18, as indicated by a sensor 169 embedded in the cushion 22, with a threshold; or
- the central seat 20 is occupied, for example by comparing a load applied to the central cushion 28, as indicated by a sensor 169 embedded within the central cushion 28, with a threshold.

It will be appreciated that it would be undesirable to attempt to fold the second seat 18 if any of these conditions are true. In particular, folding the second seat 18 if the second seat 18 or the central seat 20 is occupied would cause discomfort to the occupant. Moreover, any request for folding in such circumstances is likely to have been generated in error and so ideally should not be acted upon.

Accordingly, if any one or more of these conditions is found to be true, the RRSM 168 determines that it is not possible to fold the second seat 18 and generates at step 184 an indication of this. This indication may be signalled to the user through the input module 158, for example, or alternatively the indication may be transmitted to the driver's mobile device for displaying to the driver through a compatible application. The indication may not be displayed to the driver at all, and instead used only internally within the control system 3 as a control variable.

If none of those conditions are true, the RRSM 168 then checks at step 186 whether a folding operation has been requested, which involves checking for a fold flat request on the vehicle network 156. If not, the folding process 180 returns to the initial checking step, and continues to iterate the first two steps of the process 180 until a folding request is detected, or until one of the above conditions becomes true.

By performing the initial checks before registering a request to fold the second seat 18, the control system 3 is ready to respond to such requests immediately. This principle applies to the pre-checks associated with all of the processes shown in FIGS. 21 to 30.

Once a folding request is detected, the RRSM 168 sends at step 188 a request to the PSM 164 to move the front passenger seat 82 to a safe position. By moving the front passenger seat 82, a collision between the headrest 26 of the second seat 18 and the squab 84 of the front passenger seat 82 as the second seat 18 folds may be avoided.

In this respect, it is noted that, as is conventional, the front passenger seat 82 is moveable forwards and backwards and its squab 84 may tilt to afford comfort to its occupant. If positioned too far rearward and/or tilted too greatly, the front passenger seat 82 leaves insufficient space within the passenger compartment 2 for the second seat 18 to fold. This defines a second clash zone 98, namely an area that no part of the front seat 82 should occupy to avoid a clash with the second seat 18 during folding. The safe position for the front passenger seat 82 is defined as the most rearward position that allows sufficient room for the second seat 18 to fold, in other words the most rearward position that is outside the second clash zone 98. In this way, inconvenience to an occupant of the front passenger seat 82 may be minimised.

After the request has been transmitted, and in some embodiments while the front passenger seat 82 is moving to the safe position, the RRSM 168 checks at step 190 whether the cushion 22 of the second seat 18 is in the first clash zone 96, namely a configuration in which the cushion 22 will obstruct rotation of the squab 24. If so, the cushion slide motor 134 is operated at step 192 to slide the cushion 22 forward using its second mode of movement, and the pivoting member 92 is controlled to move the squab 24 backwards as required, until they reach safe positions, as described earlier with reference to FIG. 7c.

As illustrated in the Gantt chart of FIG. 22, the RRSM 168 may also be arranged to check that the calf rest 27 and the headrest 26 are in their respective stowed and folded configurations, and if not to operate the calf rest arm motor 130 and calf rest cushion motor 132 to move the calf rest 27 into its stowed position (for example as described above with reference to FIG. 15) and/or to operate the headrest tilt motor 112, the headrest horizontal motor 120 and the headrest vertical motor 118 to move the headrest 26 into its folded configuration.

Referring back to FIG. 21, if the cushion 22 of the second seat 18 is not in the first clash zone 96, or once the cushion 22 and squab 24 have been moved to safe positions, the RRSM 168 then operates at step 194 the armrest motor 117 to stow the armrest 30. Next, the first central motor 140 is controlled at step 196 to effect 'bunny hop' movement of the central cushion 28 upwardly, to draw substantially level with the cushions 22 of the first and second seats 16, 18.

The squab 24 of the second seat 18 is then reclined at step 198 to engage the bulkhead 8 behind it. As already noted, this provides a consistent and predictable starting position for folding movement of the squab 24 and the bulkhead 8, thereby aiding the control system 3.

Once the squab 24 engages the bulkhead 8, the associated bulkhead actuator 148 is released at step 200. The RRSM 168 then checks at step 202 whether the squab 24 and cushion 22 of the second seat 18 have reached safe positions and, if not, the RRSM 168 waits until this condition is satisfied. Once the safe positions are reached, the RRSM 168 operates at step 204 the squab motor 144 and the bulkhead motor 146 to fold the bulkhead 8 and squab 24, in other words, to move the bulkhead 8 and squab 24 into the folded configuration, as shown in FIGS. 7a to 7e.

During folding movement, the RRSM 168 continuously checks at step 206 for signals indicating any of the following conditions:
that folding movement has been cancelled by the user, either through the input module 158 or the relevant switch pack 170;
a pinch condition has been detected, for example as indicated by a surge in electrical current drawn by either the squab motor 144 or the bulkhead motor 146;
the second seat 18 being occupied, for example as indicated by a sensor embedded in the cushion 22;
engagement of the seat belt system of the second seat 18; or
occupation of the central seat 20.

If signals indicating that any of these conditions are detected, the RRSM 168 stops at step 208 folding movement and generates an indication that folding has been cancelled. This indication is passed to the control system 3, and is communicated to the user through the input module 158 or the driver's mobile device as for an indication arising from the pre-checks.

The RRSM 168 may then reverse the folding movement to return the bulkhead 8 and squab 24 to their original positions, or may wait for a signal indicating whether to continue or to return the bulkhead 8 and squab 24 to their original positions. Otherwise, the RRSM 168 checks at step 210 whether folding movement has completed based on the indicated positions of the squab motor 144 and bulkhead motor 146. If folding has not completed, the RRSM 168 reiterates the check for any of the above conditions that trigger cancellation of folding.

If folding is complete, the RRSM 168 ceases operation of the squab motor 144 and the bulkhead motor 146 at step 212, and indicates that the second seat 18 is folded, for example through the infotainment system. The process 180 then ends.

The above procedure assumes that the armrest 30 is deployed when the folding operation is requested, noting that the armrest 30 is deployed by default. Of course, if the armrest 30 is stowed when folding is requested, the steps associated with stowing the armrest 30 may be dispensed with. Alternatively, a request to stow the armrest 30 may still be issued, but will have no effect as the armrest 30 is already stowed.

It is also noted that the reason for ensuring that the armrest 30 is stowed before folding the second seat 18 is that in this embodiment the armrest 30 and the second seat 18 are mechanically linked such that movement of the armrest 30 is controlled relative to the position of the second seat 18. An alternative way to deal with this configuration is to drive the armrest 30 upwardly simultaneously with folding the second seat 18, such that the armrest 30 remains stationary relative to the seat cushion 22.

In other embodiments there may be no such requirement to control the position of the armrest 30 relative to the second seat 18, in which case the second seat 18 may be folded while the armrest 30 is deployed, and in turn the steps of checking and controlling the position of the armrest 30 may be omitted from the folding sequence.

Figure 23:
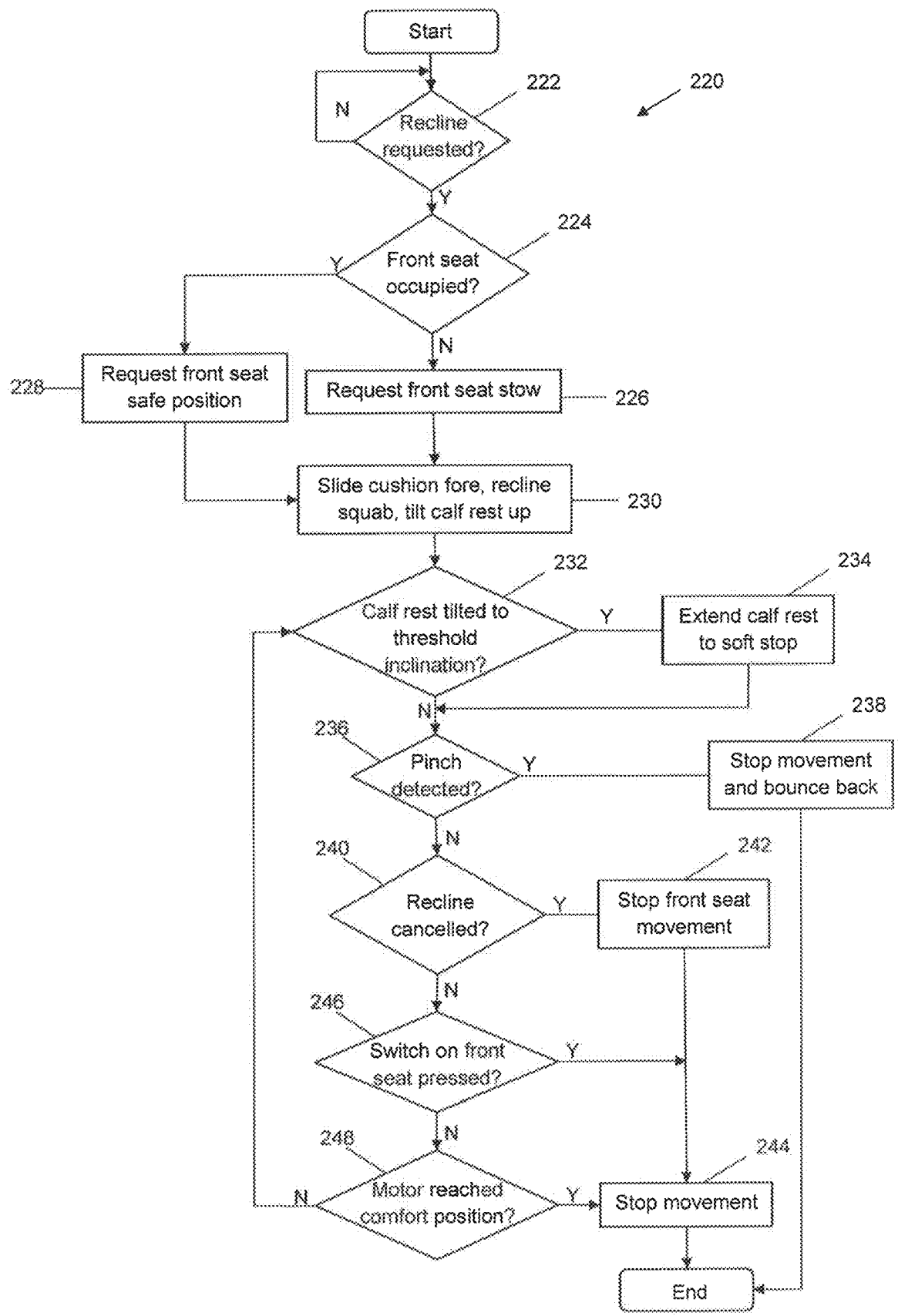
FIG. 23 is a flow diagram showing a process according to an embodiment of the invention for reclining a seat of the rear seating arrangement of FIG. 1.

FIG. 23 shows a 'one touch recline' process 220, in which the second seat 18 and the front seat 82 are moved from their default configurations into the configurations shown in FIG. 12 in a single operation that may be activated by a dedicated switch in a switch pack 170 associated with the second seat 18. Alternatively, the recline process 220 may be requested through another interface such as the input module 158 or a mobile device application.

Figure 24:
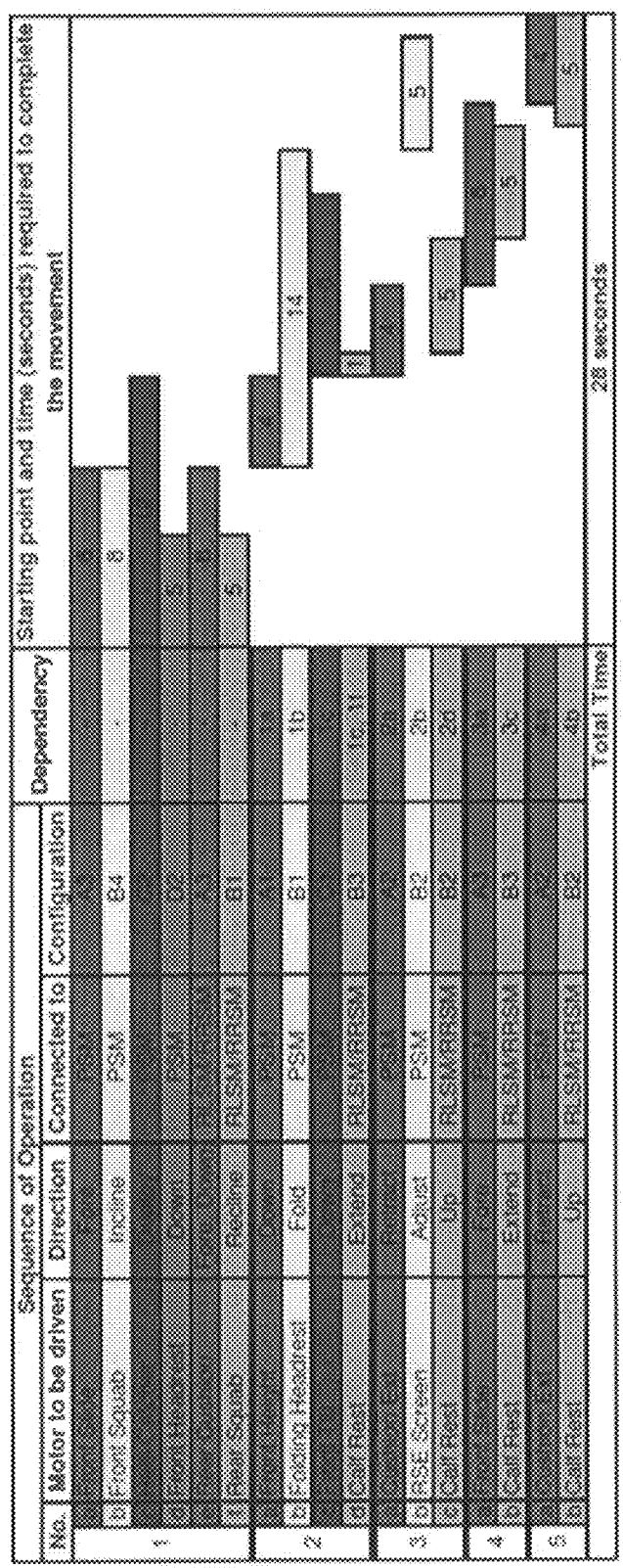
FIG. 24 is a Gantt chart showing steps of the process of FIG. 23.

FIG. 24 is a Gantt chart showing steps of the recline process 220 of FIG. 23 to illustrate possible timings of the sequence. The following description refers to the process 220 shown in FIG. 21 specifically, but the skilled reader will readily understand the Gantt chart of FIG. 22 and be able to relate it to the steps of the process 220 outlined below.

As the recline process 220 involves both the second seat 18 and the front seat 82, both the RRSM 168 and the PSM 164 have roles in implementing the process 220. The RRSM 168 has overall control of the process 220, but sends requests to the PSM 164 when movements of the front seat 82 are required.

The recline process 220 begins with the RRSM 168 checking at step 222 for a request for reclining the second seat 18. If no such request is detected, the RRSM 168 iterates this initial step of the process until such a request is received.

Once a request to recline is received, the RRSM 168 sends at step 224 a request to the PSM 164 for confirmation as to whether the front seat 82 is occupied. The PSM 164 gathers this information, for example by checking signals received from an occupant detection system or sensors 165 of the front seat 82, and transmits a response to the RRSM 168 accordingly. For example, the PSM 164 may compare signals indicative of a load applied to the cushion 86 of the front seat 82 with a threshold load, and determine that the front seat 82 is occupied if the indicated load exceeds the threshold load.

If the front seat 82 is not found to be occupied, for example if the indicated load on the front seat cushion 86 is below the threshold load, the RRSM 168 sends at step 226 a request to the PSM 164 to move the front seat 82 to its stowed configuration, as shown in FIG. 12.

Otherwise, if the front seat 82 is occupied, the RRSM 168 sends at step 228 a request to the PSM 164 to move the front seat 82 to a safe configuration. The safe configuration is one that allows more space for the second seat 18 to recline without compromising the comfort of the occupant of the front seat 82. For example, the safe configuration may entail ensuring that the squab 84 of the front seat 82 is generally upright, and that the front seat 82 is moved fore to some extent. The precise nature of the safe configuration will be customisable according to the constraints of each vehicle model and taking into account the outcomes of human factor studies.

Once the front seat 82 is in either its safe configuration or its stowed configuration, the RRSM 168 begins to reconfigure the second seat 18 into the configuration shown in FIG. 12 at step 230 by operating the cushion slide motor 134 to slide the cushion 22 forward, the squab motor 144 to tilt the squab 24 rearward, and the calf rest arm motor 130 to tilt the calf rest 27 upwardly. FIG. 24 shows the precise timing of these actions; specifically, the cushion 22 and the squab 24 move simultaneously, whereas the tilting of the calf rest 27 is initiated after movement of the cushion 22 and the squab 24 completes.

As illustrated in FIG. 24, and as described above with reference to FIG. 14, prior to operating the calf rest arm motor 130 to tilt the calf rest 27, the RRSM 168 may operate the calf rest cushion motor 132 to move the calf rest cushion 80 downwardly on the calf rest arms 78 into a first position to avoid a clash between the calf rest 27 and the seat cushion 22 when the calf rest 27 is tilted upwards.

While tilting of the calf rest 27 is underway, the RRSM 168 continuously checks the angle at which the calf rest 27 is oriented, as indicated by a sensor 169 associated with the calf rest arm motor 130. The present calf rest angle is compared at step 232 with a threshold that generally corresponds to an angle at which the calf rest 27 may safely extend without risk of impacting the floor of the vehicle 6 or a component of the front seat 82. This threshold may be expressed as an angle, for example, or as a proportion of the total range of pivoting movement of which the calf rest 27 is capable.

In this example, the threshold is 80% of the range of movement, meaning that the calf rest 27 must have pivoted 80% of the way towards its maximum inclination from its stowed configuration. This value is selected as it both avoids a collision of the calf rest 27 with the floor or the front seat 82 when the calf rest 27 is subsequently extended, and is optimised for the comfort of an occupant of the second seat 18.

If the calf rest inclination is below the threshold, the RRSM 168 continues to drive the calf rest arm motor 130 to tilt the calf rest 27 upwardly until the threshold is reached. Once the threshold is reached, the RRSM 168 ceases operation of the calf rest arm motor 130 and commences extension of the calf rest 27 by driving the calf rest cushion motor 132 at step 234.

While any of the above movements are underway, comprising tilting and extension of the calf rest 27, the RRSM 168 monitors at step 236 for an indication of a pinch condition, for example as indicated by increased power consumption by the calf rest arm motor 130 or calf rest cushion motor 132. If a pinch condition is detected, the RRSM 168 ceases movement of the calf rest 27 and 'bounces back' to withdraw the calf rest 27 from the cause of the pinch condition at step 238. The recline process 220 then ends.

If no pinch condition is detected, the RRSM 168 checks at step 240 whether the recline process 220 has been cancelled, for example by the user releasing the appropriate button in the switch pack 170. If so, the RRSM 168 sends a request to the PSM 164 to cease movement of the front seat 82 at step 242, then ceases movement of any components of the second seat 18 that are underway at step 244, and the recline process 220 then ends.

If the recline process 220 continues to be requested, the RRSM 168 interrogates the PSM 164 at step 246 to check whether any switches associated with the front seat 82 have been pressed. If the PSM 164 indicates that any such switches have been pressed, any movements that are underway are stopped at step 244, since the pressing of the switch may indicate that an occupant of the front seat 82 wishes to reject the recline operation. As the recline process 220 impacts an occupant of the front seat 82, this step of the process 220 beneficially gives such an occupant a degree of control over the operation.

If none of the front seat switches have been pressed, the RRSM 168 checks at step 248 whether a position defining a motor comfort position has been reached for each of the motors involved in the process. The comfort position for each motor is predetermined and defined as a position that corresponds to the respective component of the second seat 18 being in the correct position for the reclined configuration shown in FIG. 12.

The position of each motor may be indicated by sensors associated with the respective motors. For example, any of the motors may be a stepper motor comprising an encoder that provides a real-time indication of the position of the respective motor. Indeed, it should be noted that any of the motors of the set of motors that controls the seating arrangement 1 may be stepper motors with associated encoders to provide real-time indications of the positions of their respective motors.

If any motor is found to have reached its comfort position, the RRSM 168 ceases movement of the respective component at step 244. Once all motors involved in the recline process 220 reach their respective comfort positions, the process 220 ends.

Until then, these checks reiterate until a pinch condition is detected, the recline process is cancelled, a front seat switch is pressed or all of the motors reach their respective comfort positions. It is noted that one of these conditions will eventually be met.

It will be appreciated that although only one set of the checks that occur during movement is shown in FIG. 23, these checks are performed during each stage of movement as appropriate.

Figure 25:
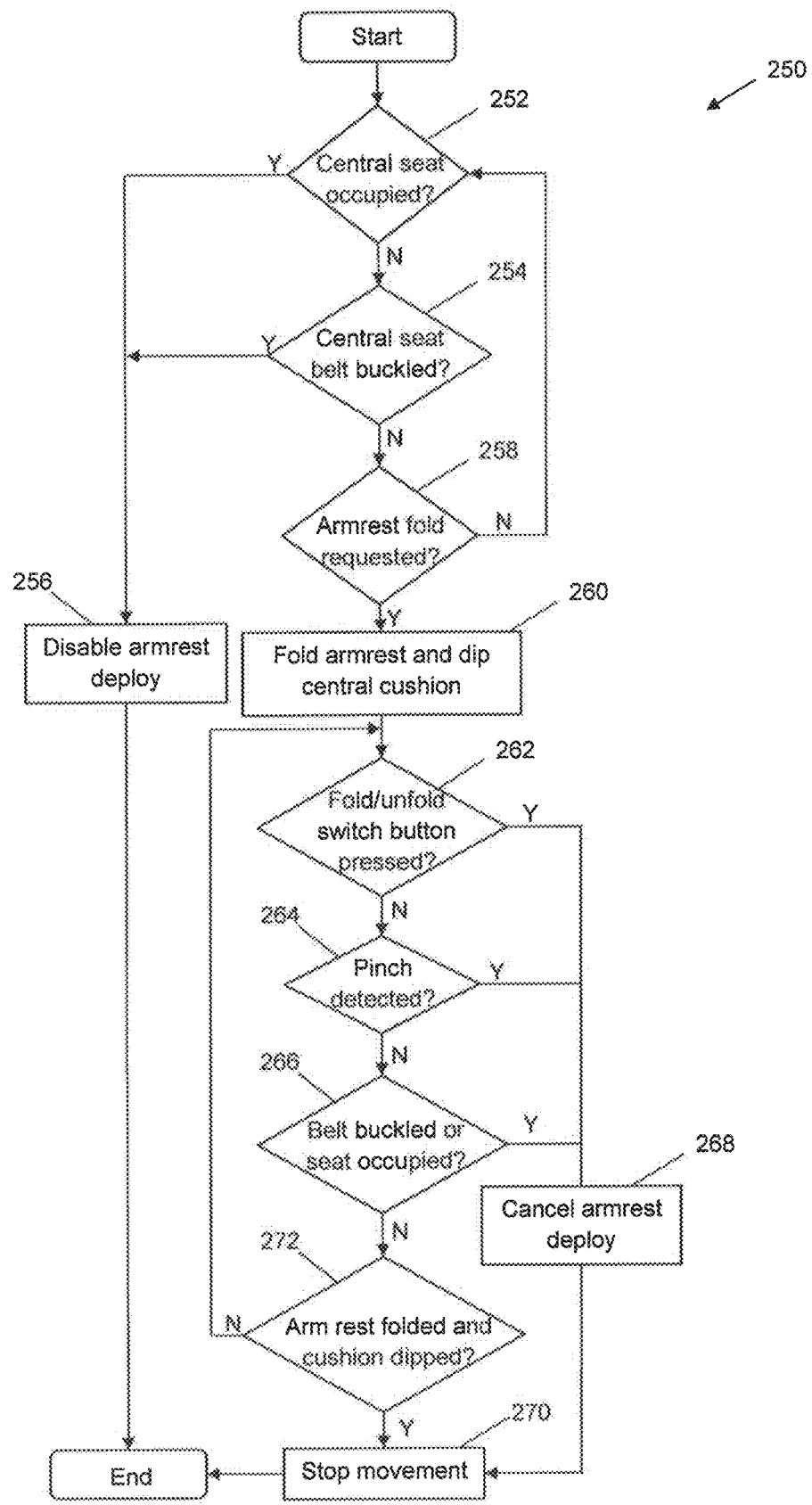
FIG. 25 is a flow diagram showing a process according to an embodiment of the invention for deploying an armrest of the rear seating arrangement of FIG. 1.
Figure 26:
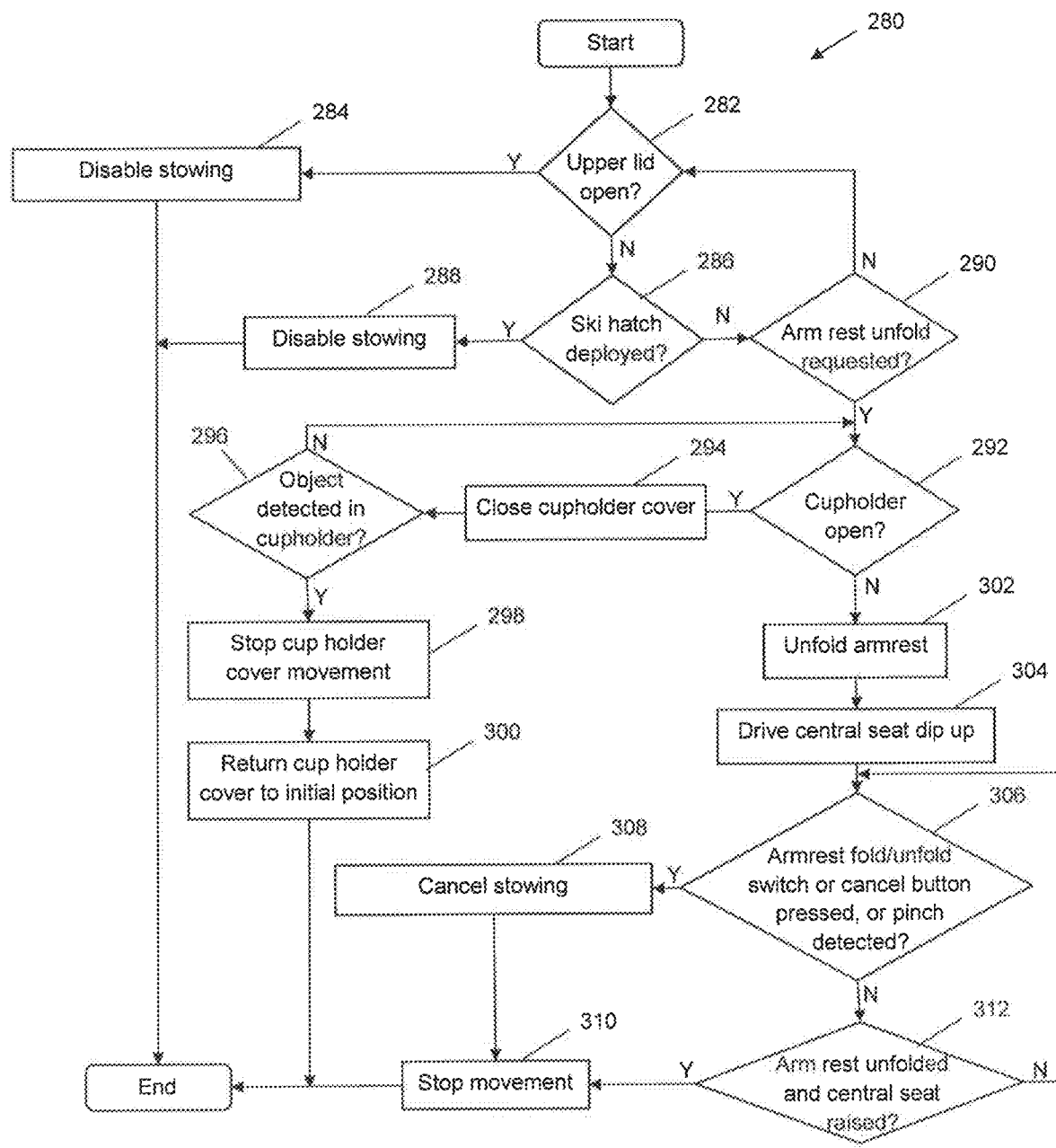
FIG. 26 is a flow diagram showing a process according to an embodiment of the invention for stowing an armrest of the rear seating arrangement of FIG. 1.

FIGS. 25 and 26 relate to procedures for deploying and stowing the armrest 30. As already noted, these processes are controlled by the RRSM 168.

In the following examples, it is assumed that the seating arrangement 1 begins in the default configuration with the armrest 30 stowed or deployed as appropriate.

Beginning with FIG. 25, a process 250 for deploying the armrest 30 is shown. The armrest deployment process 250 starts with checking at step 252 whether the central seat 20 is occupied and checking at step 254 whether the seat belt of the central seat 20 is engaged. As already described, this involves reading signals from the vehicle network 156 that are indicative of these conditions, such signals originating from, for example, one or more sensors 169 such as an embedded cushion sensor and a seat belt sensor respectively.

If either of these conditions is found to be true, deployment of the armrest 30 is disabled at step 256 by updating an associated variable in memory within the control system 3, and the process 250 ends. Once disabled, deployment cannot be request by a user through the input module 158, a switch pack 170 or through an app on a mobile device. The relevant switch or button in each of these interfaces may be disabled in a manner that indicates to the user that deployment is not available.

Otherwise, the RRSM 168 checks at step 258 for a request for deployment of the armrest 30. If no such request is detected, the process 250 returns to the beginning to reiterate the initial checks.

If a request is detected, the RRSM 168 controls the armrest motor at step 260 to commence downward pivoting movement of the armrest 30 towards the deployed configuration. Simultaneously, the RRSM 168 controls the second central motor 142 to 'dip-down' the central cushion 28, to create a recess between the cushions 22 of the first and second seats 16, 18 to receive the armrest 30.

During this movement, the RRSM 168 checks at steps 262, 264 and 266 for signals indicative of any of the following conditions:

pressing of a fold/unfold switch in one of the switch packs 170 or in the input module 158; a pinch condition;
engagement of the seat belt of the central seat 20; or
occupancy of the second seat 18.

If any one or more of these conditions is found to be true, the RRSM 168 updates the control system 3 to cancel deployment at step 268 and stops movement of the armrest 30 at step 270, before ending the process 250.

If none of the conditions is satisfied, the RRSM 168 then checks the status of the armrest motor and second central motor 142 to determine at step 272 whether the armrest 30 is fully deployed and the central cushion 28 fully dipped. If not, the RRSM 168 performs the checks for the above listed conditions that dictate ceasing of deployment, while deployment continues.

If the armrest 30 and central cushion 28 are found to be in their respective final positions, the RRSM 168 ceases operation of the armrest motor and second central motor 142 to stop movement of the armrest 30 and central cushion 28. The armrest deployment process 250 then ends.

Moving on to FIG. 26, a stowing operation 280 for stowing the armrest 30 is shown. The operation 280 begins with checking at step 282 whether the lid 72 of the armrest 30 is in its open configuration. If the lid 72 is open, attempting to stow the armrest 30 risks damage to the armrest 30 and the bulkhead 8 behind it. Accordingly, if the lid 72 is found to be open, the RRSM 168 disables stowing at step 284 by updating the relevant variable of the control system 3, and ends the stowing operation 280. As for the armrest deployment feature, if armrest stowing is inhibited any associated switches that could trigger stowing may be disabled, for example in a manner that is clear to a user.

Otherwise, if the lid 72 is in its closed configuration, the RRSM 168 then checks at step 286 whether the ski-hatch 29 is deployed. The armrest 30 would collide with the ski-hatch 29 if stowed while the ski-hatch 29 is in its open configuration, and so stowing is disabled at step 288 and the stowing operation 280 ends if the ski-hatch 29 is found to be deployed.

If the ski-hatch 29 is not deployed, the RRSM 168 then checks at step 290 for a request to stow the armrest 30. If no such request is detected, the stowing operation 280 returns to the beginning to re-iterate the checks of the status of the lid 72 and the ski-hatch 29.

If a request is detected, the operation moves on to determine at step 292 whether the retractable cover 75 is in its open configuration. If so, the RRSM 168 acts to close the retractable cover 75 at step 294.

The retractable cover 75 may be equipped with sensors that indicate obstruction to its closing, which indicates the presence of a cup in a cup holder 74. If such an obstruction is detected at step 296, indicating that an object is present in a cup holder 74, the RRSM 168 halts movement of the retractable cover 75 at step 298, returns the retractable cover 75 to its original position at step 300, and then the stowing operation 280 ends. In this respect, it is noted that it is undesirable to stow the armrest 30 if a cup is present in one of the cup holders 74, particularly if that cup contains a hot beverage.

If no object is detected in the cup holder 74, or if the cup holder 74 was not originally open, the RRSM 168 then proceeds to operate the armrest motor 117 to effect pivoting movement of the armrest 30 at step 302 towards the stowed configuration. Once the armrest 30 has begun to move upwards, the first central motor 140 is operated at step 304 to move the central cushion 28 upwardly to draw level with the cushions 22 of the first and second seats 16, 18.

The RRSM 168 checks for signals on the vehicle network 156 indicative of pressing of an armrest fold/unfold switch or a cancel switch, and of an occurrence of a pinch condition. If any such signals are detected at step 306, the RRSM 168 updates at step 308 a relevant variable within the control system 3 to indicate that stowing has been cancelled, and stops movement of the armrest 30 and the central cushion 28 at step 310. The RRSM 168 may then return the armrest 30 to its original position and the stowing operation 280 then ends.

If no signals that would trigger cancellation of stowing movement are detected, the RRSM 168 then checks at step 312 whether the armrest 30 is in the stowed configuration and the central cushion 28 is raised by reading the status of the armrest motor. If so, the RRSM 168 then stops further movement of the armrest 30, and the stowing operation 280 ends. If the armrest 30 is found not to be in the stowed configuration, the operation reiterates the steps of checking for signals that would cancel stowing and checking whether stowing is complete until the operation 280 either completes or is cancelled.

Figure 27:
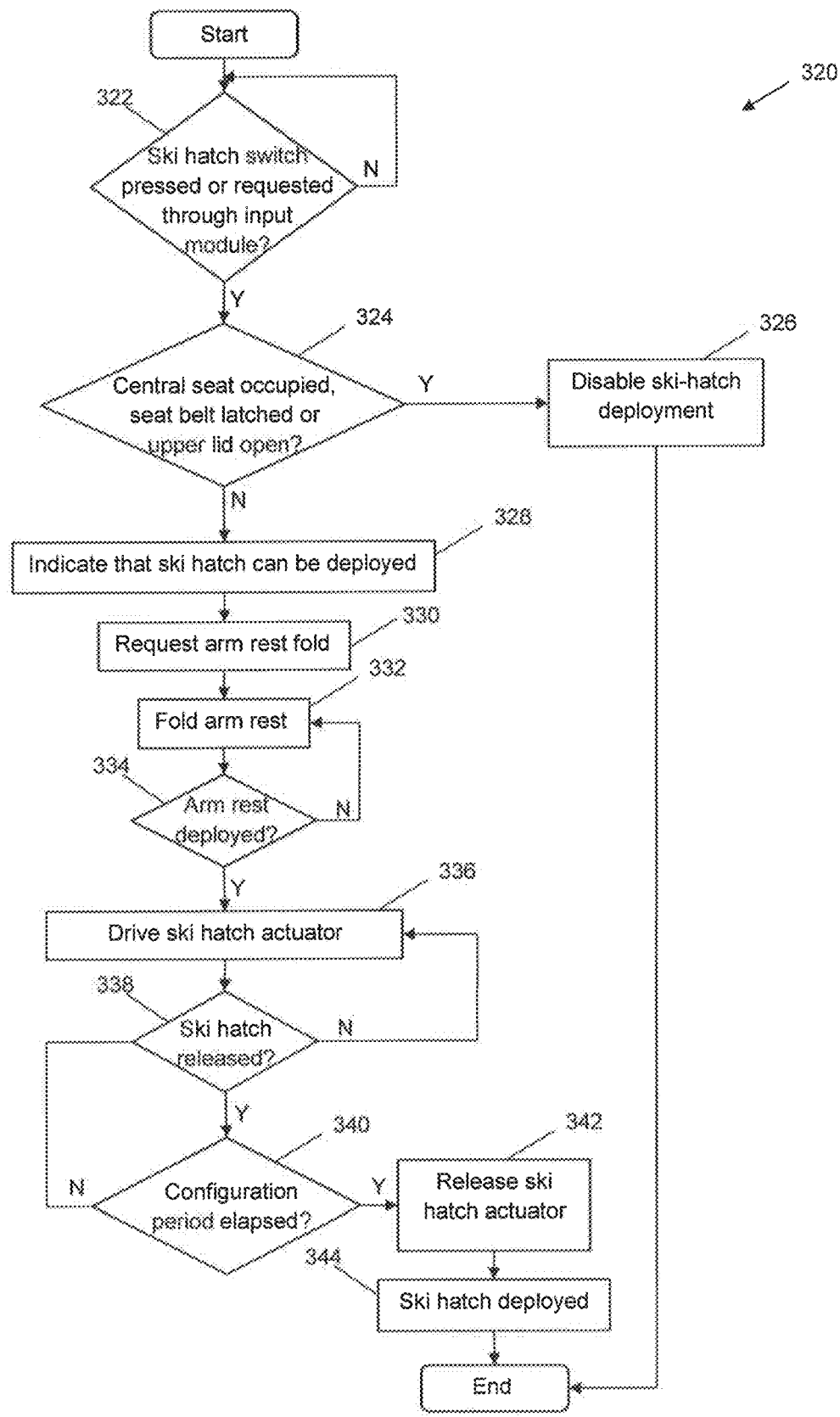
FIG. 27 is a flow diagram showing a process according to an embodiment of the invention for deploying a ski-hatch of the rear seating arrangement of FIG. 1.

FIG. 27 represents a ski-hatch deployment process 320 in which the ski-hatch 29 is moved from its closed configuration to its open configuration. As noted above, the RLSM 166 controls operation of the ski-hatch 29, and thus has responsibility for performing the ski-hatch deployment process 320.

In the following example, it is assumed that the seating arrangement 1 begins in the default configuration.

The ski-hatch deployment process 320 begins with checking at step 322 whether a ski-hatch switch has been pressed, or if ski-hatch deployment has been requested through the input module 158 or a switch pack 170. The ski-hatch switch may be located in any one of a switch pack 170, the input module 158 or an application on a mobile device for example. If no deployment request is present on the vehicle network 156, the process 320 returns to the beginning and re-iterates the check for a deployment request.

It is noted that the check for a request to initiate the ski-hatch deployment process occurs before the pre-checks to determine whether any conditions that would inhibit the process are true, unlike the processes described thus far in which the pre-checks are performed first. In practice, the ordering of the steps of the pre-checks and the detection of a request to initiate a process may vary for each process, and the ordering for each process herein described and as illustrated in the figures may vary.

If a deployment request is detected, the RLSM 166 then performs at step 324 pre-checks to determine whether any of the following conditions are true:

the central seat 20 is occupied, as indicated by a central cushion sensor 167, for example;

the central seat belt is engaged, for example as indicated by a seat belt sensor 167; and the lid 72 of the armrest 30 is open.

It will be appreciated that it would be undesirable to deploy the ski-hatch 29 if any of these conditions is true, in particular if there are any indications that a passenger is sitting in the central seat 20, in which case deployment of the ski-hatch 29 would cause discomfort to the passenger.

Accordingly, if any one or more of the above conditions is found to be true, the RLSM 166 updates variables within the control system 3 to disable ski-hatch deployment at step 326, and the process 320 then ends. Any relevant switches or interfaces that would enable a user to trigger ski-hatch deployment may also be disabled.

Otherwise, if the pre-checks are satisfied, in that none of the conditions that would trigger cancellation of the deployment process are true, the RLSM 166 indicates at step 328 to both the control system 3 and the user through an interface such as the input module 158 that the ski-hatch 29 can be deployed.

It is noted that the ski-hatch 29 cannot be deployed if the armrest 30 is in its stowed configuration. However, as the control system 3 has the ability to deploy the armrest 30, instead of checking whether the armrest 30 is stowed, for the illustrated embodiment the RLSM 166 transmits at step 330 a request to the RRSM 168 to deploy the armrest 30. In response, the RRSM 168 either indicates that the armrest 30 is in the deployed configuration, or performs the armrest deployment process of FIG. 25 at step 332 and then indicates that the armrest 30 is in the deployed configuration once folding completes. The RLSM 166 may request status updates from the RRSM 168 regarding the position of the armrest 30, to determine when the armrest 30 is deployed at step 334. Alternatively, the RLSM 166 may simply wait until a notification is received from the RRSM 168 that the armrest 30 has been deployed at step 334.

Once the armrest 30 is indicated as being deployed, the RLSM 166 then operates at step 336 the ski-hatch motor 152 to drive the ski-hatch actuator 150 to its open state to release the ski-hatch 29 to allow deployment. The RLSM 166 checks at step 338 whether the ski-hatch 29 has been successfully released, for example by checking the state of a microswitch (not shown) associated with the ski-hatch 29, and continues to operate the ski-hatch motor 152 until release is confirmed.

After the ski-hatch 29 is confirmed as released, the RLSM 166 waits at step 340 for a pre-determined configuration period to elapse to allow time for the ski-hatch 29 to deploy under spring loading, and then releases at step 342 tension from the wire 154 to allow the ski-hatch actuator 150 to revert to its closed state under spring loading. The RLSM 166 then indicates at step 344 that the ski-hatch 29 has been deployed by updating a relevant variable within the control system 3, and the ski-hatch deployment process 320 then ends.

Figure 28:
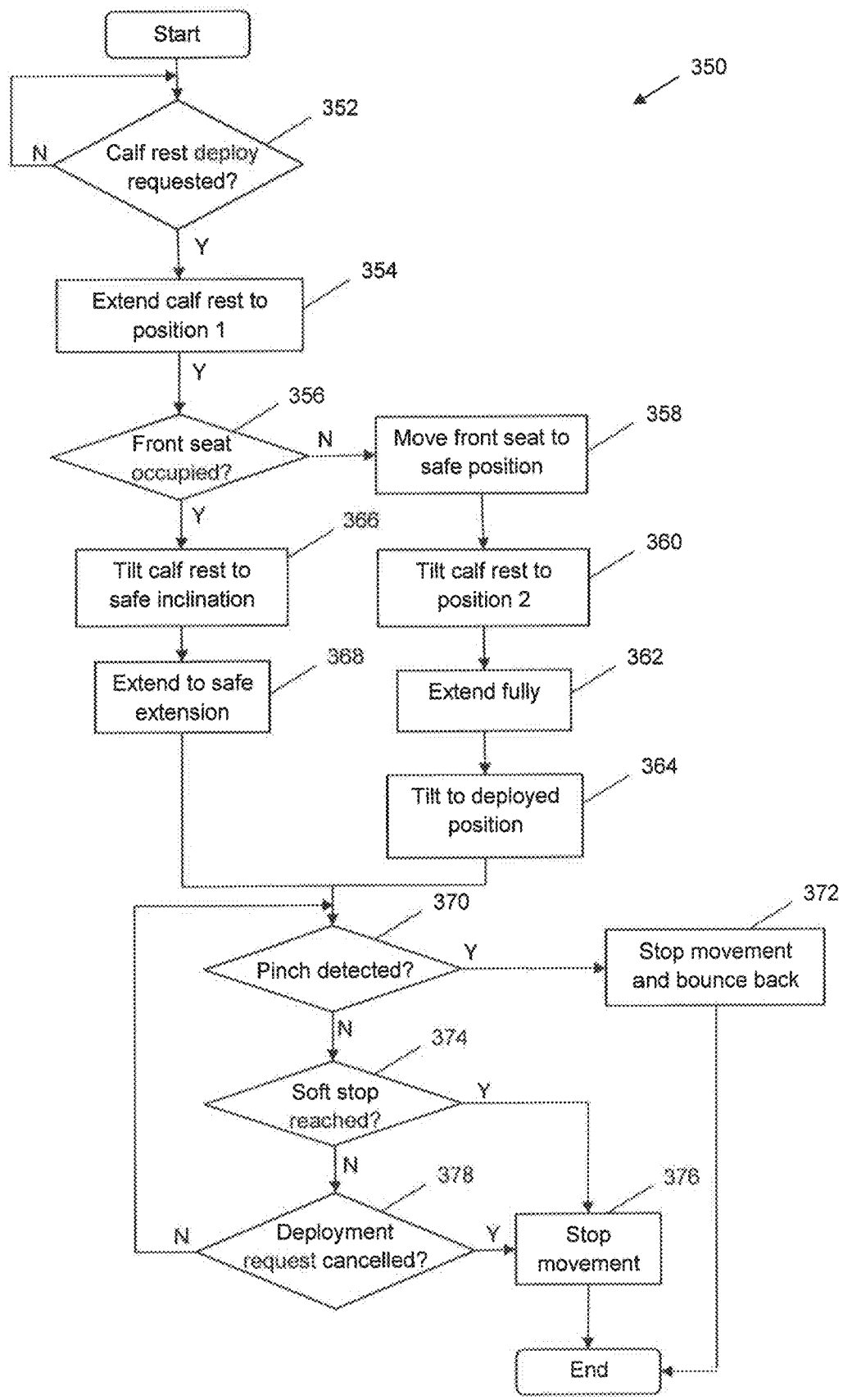
FIG. 28 is a flow diagram showing a process according to an embodiment of the invention for deploying a calf rest of the rear seating arrangement of FIG. 1.

FIG. 28 shows a calf rest deployment process 350 in which a calf rest 27 is moved through the stages shown in FIG. 14 from the stowed configuration to the deployed and extended configuration. The process 350 is described here as applied to the calf rest 27 of the second seat 18, and therefore is controlled by the RRSM 168. It will be appreciated that the RLSM 166 may implement a similar process for deploying the calf rest 27 of the first seat 16, although the deployment process may be adjusted when applied to the calf rest 27 of the first seat 16 to account for its position behind the driver's seat.

The calf rest deployment process 350 may be triggered by the user by pressing a particular button in a switch pack 170, or through another interface such as the input module 158 or a mobile device application. Accordingly, the process 350 begins by checking at step 352 whether calf rest deployment has been requested. If not, the process 350 returns to the start and reiterates the check for such a request continuously.

Once a request for deployment has been received, in this embodiment the RRSM 168 then controls the calf rest cushion motor 132 to extend the calf rest 27 at step 354 to move the calf rest cushion 80 downwardly into the first position shown in FIG. 14. As noted previously with reference to FIG. 14, this stage of movement enables subsequent pivoting of the calf rest 27 without impacting the seat cushion 22 of the second seat 18.

The RRSM 168 then checks at step 356 whether the front passenger seat 82 is occupied, as indicated by an occupant detection system comprising one or more of the sensors 169, for example. If not, the RRSM 168 sends at step 358 a request to the PSM 164 to move the front passenger seat 82 into its stowed configuration as shown in FIG. 12. As already noted, the stowed configuration corresponds to a configuration in which the front seat 82 is folded and displaced forward, and so can only be selected if the front seat 82 is not occupied. Moving the front seat 82 into the stowed configuration maximises the space available for deployment of the calf rest 27 behind it.

Once the front seat 82 is in the stowed configuration, the RRSM 168 controls the calf rest arm motor 130 to tilt the calf rest 27 upwardly into the second position at step 360. The RRSM 168 then further extends the calf rest 27 at step 362 into the third configuration, or example in which the calf rest 27 is fully extended, and then tilts the calf rest 27 further at step 364 until it reaches its deployed configuration.

Referring back to step 356, if the front passenger seat 82 is found to be occupied, in this embodiment the front seat 82 is not moved. Instead, deployment of the calf rest 27 is modified accordingly. In this situation, the calf rest 27 is first tilted to a safe inclination at step 366, and then extended to a safe extension at step 368. The safe inclination and the safe extension are arranged to avoid a collision between the calf rest cushion 80 and the front seat 82 even if the front seat 82 is in a rearward, reclined configuration.

While any of the above tilting or extending movements are underway, the RRSM 168 monitors for an indication of a pinch condition at step 370, for example as indicated by increased power consumption by the calf rest arm motor 130 or calf rest cushion motor 132. If a pinch condition is detected, the RRSM 168 ceases movement of the calf rest 27 at step 372 and 'bounces back' to withdraw the calf rest 27 from the cause of the pinch condition. The calf rest deployment process 350 then ends.

If no pinch condition is detected, the RRSM 168 checks at step 374 whether a position defining a soft stop has been reached, as indicated by sensors 169 associated with the calf rest arm motor 130 and the calf rest cushion motor 132. For example, as noted above the calf rest arm motor 130 and the calf rest cushion motor 132 may be stepper motors comprising encoders that provide an indication of the position of the respective motor at any time.

If the soft stop is found to have been reached, the RRSM 168 ceases movement of the calf rest 27 at step 376, and the process 350 ends. Otherwise, if the calf rest 27 has not reached the soft stop, the RRSM 168 checks at step 378 whether deployment has been cancelled, for example by the user releasing the appropriate button in the switch pack 170. If so, the RRSM 168 ceases movement of the calf rest 27, and the calf rest deployment process 350 ends.

If deployment has not been cancelled, these checks reiterate until a pinch condition is detected, the calf rest 27 reaches the soft stop, or deployment is cancelled, noting that one of these conditions will eventually be met. It will be appreciated that although only one set of the checks that occur during movement is shown in FIG. 28, these checks are performed during each stage of movement as appropriate.

In summary, the RRSM 168 controls deployment of the calf rest 27 to account for surrounding components of the vehicle 6 at each stage, to avoid any collisions. Accordingly, the RRSM 168 may monitor signals indicative of an angle of the calf rest 27 relative to the second seat 18 and/or relative to its stowed or deployed configurations, and use the indicated angle of the calf rest 27 to determine an extension limit for the calf rest 27 in all situations. The RRSM 168 may only extend the calf rest 27 within the calculated extension limit.

It should be appreciated that, in practice, the indicated angle for the calf rest 27 may not be provided with respect to the seat 18, and may be monitored relative to another vehicle component or with respect to the range of movement of the calf rest 27 itself. For example, a signal received from an encoder of a stepper motor acting as the calf rest arm motor 130 may simply indicate the position of the motor 130 with respect to its overall range of movement. Such signals are nonetheless indicative of the angle of the calf rest 27 relative to the second seat 18, since they can be converted directly into an angle relative to the seat 18 based on the known geometric relationship between the seat 18 and the calf rest arm motor 130 or other component in question.

The extension limit may be dynamically adjusted for the present orientation of the calf rest 27, taking into account the positions of the vehicle floor and the front seat 82, to ensure that the calf rest 27 does not impact any other component during deployment movement. Alternatively, the extension limit may be adjusted in steps with respect to threshold calf rest angles. For example, the extension limit may be adjusted in dependence on whether the indicated angle of the calf rest equals or has passed the threshold angle, that threshold angle being measured relative to the same reference point as the calf rest angle, for example the seat 18 or the stowed configuration. In this situation, the calf rest 27 may be extended up to a first extension if the calf rest angle is below the threshold angle, and up to a second extension if the calf rest angle equals or exceeds the threshold angle, for example.

The positions of the vehicle floor and the front seat 82 may be determined, in part, with reference to a vehicle type identifier that is indicative of a type or model of the vehicle 6. For example, the vehicle type identifier may indicate a wheelbase of the vehicle 6, which in turn provides information regarding internal dimensions and the positioning of components within the vehicle 6.

The skilled reader will appreciate that to control movement of the calf rest 27 effectively, an extension limit must be known in some form at all times. However, it is noted that determining the extension limit may be an inherent element of the deployment process, and not necessarily an explicit step. This applies to any operation involving extension of the calf rest 27, including the recline process of FIG. 23 and an extension process about to be described below with reference to FIG. 29.

Figure 29:
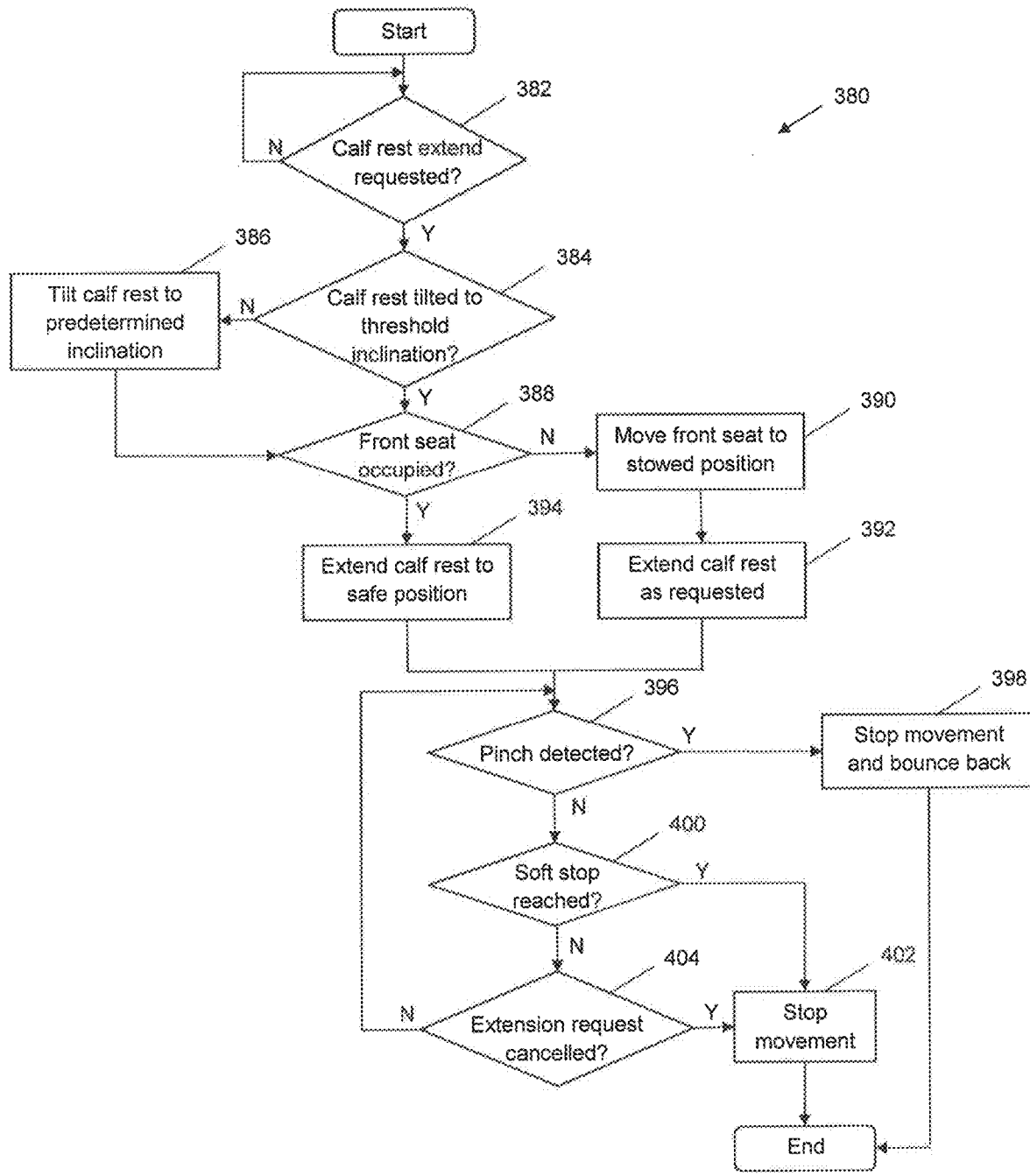
FIG. 29 is a flow diagram showing a process according to an embodiment of the invention for extending a calf rest of the rear seating arrangement of FIG. 1.

As well as being able to deploy fully in one discrete process as described above, it is also possible for the user to control tilting and extension movements of the calf rest 27 individually using dedicated buttons in the associated switch pack 170, or through another interface such as the input module 158 or a mobile device application. FIG. 29 shows a calf rest extension process 380 by which the RRSM 168 controls extension of the calf rest 27 of the second seat 18 in response to a user request.

Similarly to the process of FIG. 28, the extension process 380 of FIG. 29 begins by checking at step 382 whether calf rest extension has been requested through one of the possible interfaces such as those mentioned above, and reiterates this check continuously until a request is received.

Once a request for extension has been received, in this embodiment the RRSM 168 then checks the angle at which the calf rest 27 is presently oriented, as indicated by a sensor associated with the calf rest arm motor 130. The present calf rest angle is compared at step 384 with a threshold that generally corresponds to an angle at which the calf rest 27 can safely extend without risk of impacting the floor of the vehicle 6 or another vehicle component. As for the threshold of the recline process 220, this threshold may be expressed as an angle, for example, or as a proportion of the total range of pivoting movement of which the calf rest 27 is capable. As in the recline process 220, in this example the threshold is 80% of the range of movement.

If the calf rest inclination is below the threshold, the RRSM 168 then drives the calf rest arm motor 130 at step 386 to tilt the calf rest 27 upwardly until the threshold is reached.

Once the calf rest 27 has been confirmed as being oriented at or above the threshold inclination, the RRSM 168 then checks at step 388 whether the front passenger seat 82 is occupied, as indicated by an occupant detection system, for example. If not, as for the above deployment process the RRSM 168 sends at step 390 a request to the PSM 164 to move the front passenger seat 82 into the stowed configuration.

Once the front seat 82 is in the stowed configuration, the RRSM 168 then controls the calf rest cushion motor 132 to extend the calf rest 27 at step 392 for as long as the user continues to request extension, until the calf rest cushion 80 reaches a hard end that defines its limit of movement.

If the front passenger seat 82 is found to be occupied, as for the above deployment process, extension of the calf rest 27 is modified accordingly. Specifically, instead of extending to the hard end, the RRSM 168 extends at step 394 the calf rest 27 in accordance with the user request until the predefined safe extension referred to above is reached, at which point the calf rest 27 is extended no further.

While the calf rest 27 is tilting to the threshold angle or extending in accordance with the user request to the hard end or the safe extension, the RRSM 168 monitors at step 396 for an indication of a pinch condition, for example as indicated by increased power consumption by the calf rest arm motor 130 or calf rest cushion motor 132. If a pinch condition is detected, the RRSM 168 ceases movement of the calf rest 27 at step 398 and bounces back to withdraw the calf rest 27 from the cause of the pinch condition. The extension process 380 then ends.

If no pinch condition is detected, the RRSM 168 checks at step 400 whether the hard end or soft stop has been reached as appropriate, as indicated by sensors associated with the calf rest cushion motor 132. If so, the RRSM 168 ceases movement of the calf rest 27 at step 402, and the extension process 380 ends.

If the calf rest 27 has not reached the soft stop, the RRSM 168 checks at step 404 whether extension has been cancelled, for example by the user releasing the relevant button in the switch pack 170. If so, the RRSM 168 ceases movement of the calf rest 27, and the process 380 ends. Otherwise, the RRSM 168 continues extending the calf rest 27 and reiterates the checks until a pinch condition is detected, the calf rest 27 reaches the hard end, or extension is cancelled.

As for the process of FIG. 28, only one set of the checks that occur during movement is shown in FIG. 29 for simplicity, but these checks are performed during each stage of movement as appropriate.

Figure 30:
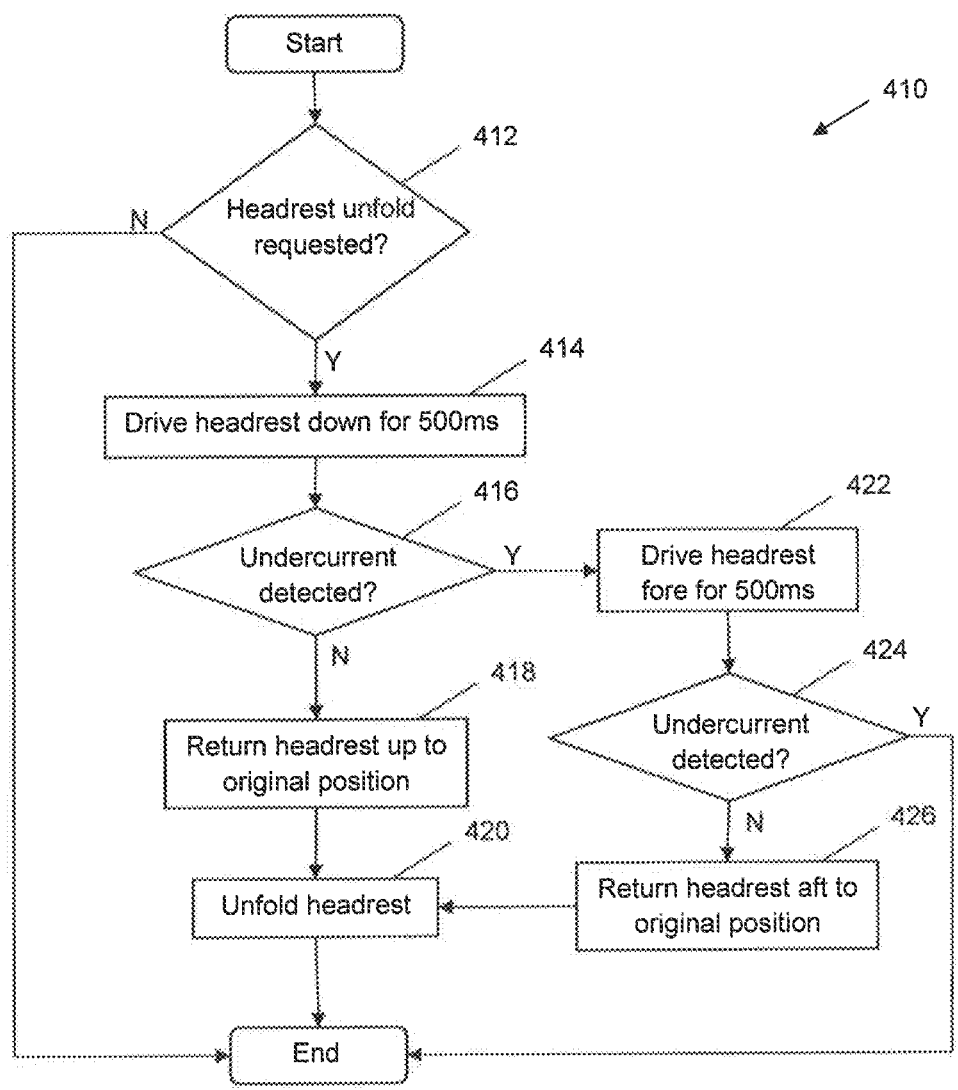
FIG. 30 is a flow diagram showing a process according to an embodiment of the invention for detecting the presence of a headrest.

FIG. 30 shows a headrest tilt process 410 for controlling tilting movement of the headrest 26 to ensure that the headrest tilt motor 112 is not driven if the headrest 26 is absent. As noted previously, driving the headrest tilt motor 112 when the headrest 26 is not present may prevent reinsertion of the headrest rods 108 into a squab 24, and is therefore undesirable. Accordingly, the method illustrated in FIG. 30 determines if the headrest 26 is attached to the squab 24 prior to operating a tilt motor 112 to commence tilting movement of the headrest 26 by checking for the presence of at least one electrical component that is located within the headrest 26.

In this example, the headrest 26 is fitted to the first seat 16, and so the tilt process 410 is conducted by the RLSM 166. Equally, the process 410 could be performed by the RRSM 168 for a headrest 26 fitted to the second seat 18.

The headrest tilt process 410 begins with the RLSM 166 checking at step 412 whether a headrest unfold movement has been requested. Such a request may arise due to user interaction with an interface such as a switch pack 170, the input module 158 or a mobile device application. Alternatively, an unfold request may be generated as part of another operation, for example folding of a front seat 82 during a one touch recline process.

In some embodiments, the headrest 26 may only be removed when it is in its folded configuration. Hence, a problem can only arise if the headrest tilt motor 112 is driven from a position corresponding to the folded configuration to one corresponding to the unfolded or upright configuration, which in turn will only occur in response to an unfold request. Accordingly, the RLSM 166 may only check for the presence of the headrest 26 on receiving an unfold request, and not on receiving a fold request.

Accordingly, if an unfold movement is not requested, the tilting process 410 then ends. The RLSM 166 then returns to the start to reiterate the process 410 continuously.

However, if an unfold movement is requested, the headrest tilt process 410 then commences a plausibility check in which the RLSM 166 attempts to drive each of the internal motors 118, 120 of the headrest 26, and determines that the headrest 26 is absent if neither the headrest vertical motor 118 nor the headrest horizontal motor 120 responds.

Specifically, the RLSM 166 first attempts to drive the headrest vertical motor 118 at step 414 to move the headrest 26 downwardly on the headrest rods 108 by applying an electrical voltage to a contact of the electrical terminal within the sleeve 110 of the squab 24 corresponding to the headrest vertical motor 118. The RLSM 166 compares at step 416 the electrical current drawn at said contact for the headrest vertical motor 118 while the voltage is applied with a threshold value. In this embodiment, the RLSM 166 takes ten samples over a period of around 500 milliseconds, each sample involving applying a voltage for a period of ten milliseconds and measuring the current draw. An average current draw over the ten samples is then determined.

An average current draw below the threshold indicates an undercurrent scenario, in that the current is less than would be expected if the motor were consuming electrical power. An undercurrent situation is typically indicative of a failed connection, for example because the motor is not connected to the circuit because the headrest 26 is absent.

If the current drawn exceeds the threshold, it is assumed that the headrest vertical motor 118 is consuming power and must therefore be present. In turn, the headrest 26 must be present. Accordingly, in this situation the RLSM 166 then applies at step 418 a reverse voltage to the headrest vertical motor 118 to return the headrest 26 to its original position, noting that the headrest 26 will have been moved downwardly on the headrest rods 108 during the period in which the test voltage was applied. Then, as the headrest 26 has been found to be present, the RLSM 166 drives the headrest tilt motor 112 to unfold the headrest 26 at step 420 in response to the request, and then the tilting process 410 ends.

Alternatively, if an undercurrent is detected, the RLSM 166 then performs a similar test with the headrest horizontal motor 120, in that the RLSM 166 attempts at step 422 to move the headrest 26 fore by applying an appropriate voltage to a contact of the electrical terminal within the sleeve 110 of the squab 24 corresponding to the headrest horizontal motor 120, and checks for an undercurrent at step 424. As above, if the current drawn is above the threshold, this must mean that the headrest 26 is present, and so the RLSM 166 moves the headrest 26 aft to its original position at step 426 and then drives the headrest tilt motor 112 to satisfy the unfold request, before ending the process 410.

If undercurrent is detected in the headrest horizontal motor 120 as well as in the headrest vertical motor 118, this is assumed to indicate that neither motor 118, 120 is present and so the headrest 26 is absent. Accordingly, in this event the RLSM 166 ignores the headrest fold request and ends the process 410 without taking further action.

It is noted that the RLSM 166 could check just one of the motors of the headrest 26 to try to determine whether the headrest 26 is present. However, an undercurrent in only one motor could arise for reasons other than that motor being absent. For example, the motor may have developed a fault, or there may be a fault in the electrical connection to the motor. However, it is highly unlikely that a fault would develop in both motors at the same time, and so for this reason both motors are tested and only an undercurrent in both is sufficient to ignore the headrest fold request in this embodiment.

Figure 31:
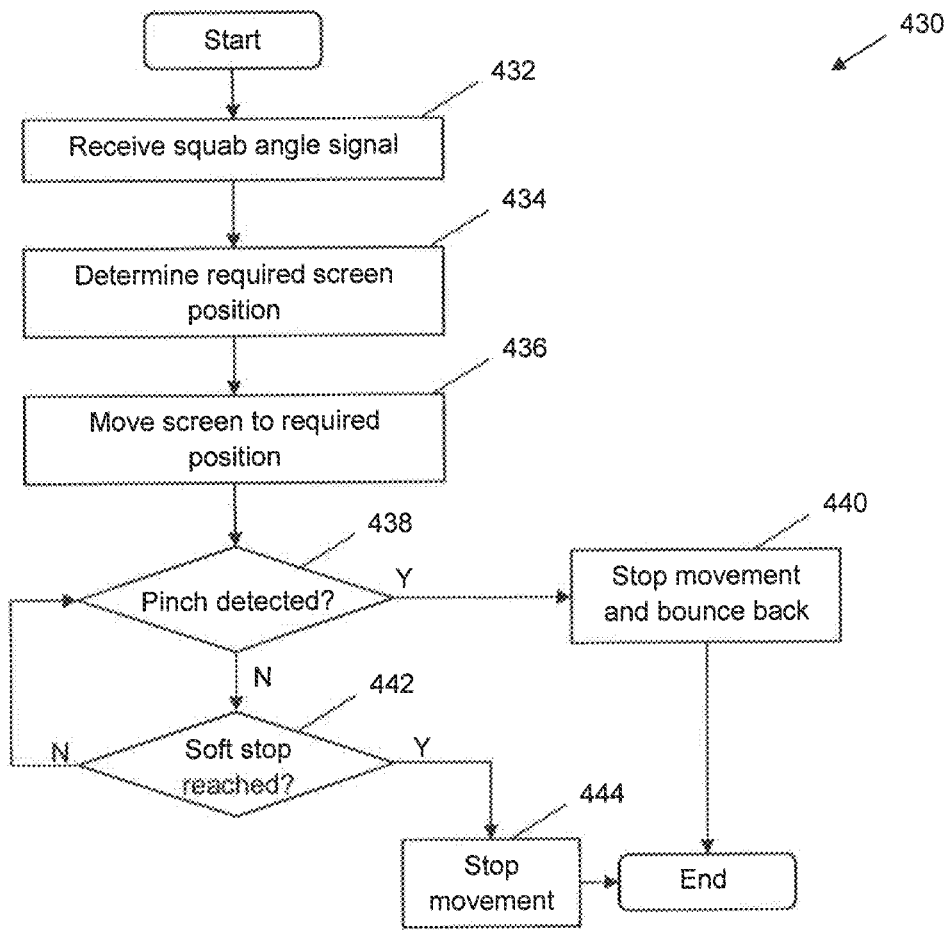
FIG. 31 is a flow diagram showing a process according to an embodiment of the invention for adjusting the position of a screen mounted to the rear of a front passenger seat.

FIG. 31 shows an example of a process 430 by which the position of the screen 102 mounted to the squab 84 of the front seat 82 may be controlled. As noted above, the position of the screen 102 may be altered in accordance with the position of the squab 84 of the front seat 82 through pivoting movement of the screen bracket 104 relative to the squab 84 and/or of the screen 102 relative to the screen bracket 104. Such movement may be driven by at least one screen motor integrated within the screen bracket 104 and/or the squab 84 of the front seat 82.

The screen 102, the screen bracket 104, the front seat squab 84 and the screen motor(s) are components of the front seat 82 and so in the illustrated embodiment are under the control of the PSM 164. Accordingly, the screen adjustment process 430 of FIG. 31 may be implemented by the PSM 164. In this way, the screen motor, the PSM 164 and the screen bracket 104 represent a positioning system that is configured to alter the position of the screen 102.

In the example shown in FIG. 31, for simplicity only the angle of the screen 102 relative to the squab 84 is adjusted, and the screen position is determined based solely in dependence on the angle of the squab 84. In other embodiments, the screen position may be adjusted to account for horizontal displacement of the front seat 82 also, and adjusting the screen positon may include horizontal and vertical displacement of the screen 102 instead of or in addition to pivoting movement.

The screen adjustment process 430 begins with the PSM 164 receiving at step 432 a signal indicative of the angle of the front seat squab 84. Such a signal may be received from the sensor 83 embedded within the front seat 82, for example. Based on the indicated squab angle, the PSM 164 then determines at step 434 the required screen position to maintain a desired viewing angle for an occupant of the second seat 18. As already discussed, the screen position may be adjusted to maintain the screen 102 in a substantially vertical orientation, or to face the screen 102 towards the headrest 26 of the second seat 18, for example. The screen position can also be adjusted to maintain a user-adjustable orientation.

Once the required position for the screen 102 has been determined, the PSM 164 then operates the screen motor to drive pivoting movement of the screen 102 towards the required position at step 436.

As in other movement operations described above, the PSM 164 checks at step 438 for a pinch condition while the screen 102 is moving, for example as indicated by a spike in electrical power demand by the screen motor. If a pinch condition is detected, the PSM 164 operates the screen motor at step 440 to stop movement of the screen 102 and bounce back, to return the screen 102 towards its initial position and thereby release any object that may have become trapped between the screen 102 and the squab 84 of the front seat 82. The screen adjustment process 430 then ends.

If no pinch condition is detected, the PSM 164 checks at step 442 whether the screen 102 has reached a soft stop defining the required position. If so, the PSM 164 ceases operation of the screen motor at step 444 to stop movement of the screen 102. The process 430 then ends.

If the soft stop has not been reached, the PSM 164 reiterates the checks for a pinch condition and reaching of the soft stop until one of those conditions is satisfied, at which point the process 430 ends in the appropriate manner.

Although particular embodiments of the invention have been disclosed herein in detail, this has been done by way of example and for the purposes of illustration only. The aforementioned embodiments are not intended to be limiting with respect to the scope of the appended claims, which follow. It is contemplated by the inventors that various substitutions, alterations, and modifications may be made to the invention without departing from the scope of the invention as defined by the claims.

The invention claimed is:

1. A method of controlling movement of a first component of a vehicle, the first component being a bulkhead of a rear seat of a vehicle seating arrangement, the method comprising:
    receiving a signal indicative of a state of a second component of the vehicle;
    receiving a request to move the bulkhead so that the rear seat is in a folded condition;
    moving, through operation of at least one electric motor of a control system, a squab of the rear seat into engagement with the bulkhead prior to moving the bulkhead; and
    commencing movement of the bulkhead in accordance with the request and in dependence on the signal indicative of the state of the second component.

2. The method of claim 1, wherein the second component is any one of the following: a seat cushion of the rear seat; a seat cushion of a seat adjacent to the rear seat; a headrest of the seating arrangement; an armrest of the seating arrangement; a lid of the armrest; a cup holder of the armrest; a cup holder lid of the armrest; a calf rest of the seating arrangement; a ski-hatch of the seating arrangement; a vehicle door; a vehicle door handle; an element of a seat belt system of the seating arrangement; a motor of the seating arrangement; and an electrical component embedded within a cushion of the headrest.

3. The method of claim 1, comprising moving the bulkhead and the squab together so that the rear seat is in a folded condition.

4. The method of claim 1, wherein the request to move the first component originates from any one of: a switch device associated with the seating arrangement; an input module of the vehicle; and an application executing on a mobile device or a vehicle controller.

5. The method of claim 1, wherein the second component is one of: a seat cushion of the rear seat and a seat cushion of a seat adjacent to the rear seat; and wherein the signal indicative of the state of the second component comprises an indication of a load applied to the second component.

6. The method of claim 5, wherein the signal indicative of the state of the second component originates from a sensor embedded within the second component and wherein the sensor forms part of an occupancy detection system.

7. The method of claim 5, comprising disabling movement of the first component if a load applied to the second component exceeds a threshold.

8. The method of claim 1, wherein the second component is one of: a seat cushion of the rear seat and a seat cushion of a seat adjacent to the rear seat; and wherein the signal indicative of the state of the second component comprises an indication of a position of the second component, the method comprising commencing movement of the first component only if the second component is outside a first clash zone between the second component and the squab of the rear seat.

9. The method of claim 8, comprising moving the second component to a position outside the first clash zone if the signal indicative of the state of the second component indicates that the second component is in the first clash zone, and then commencing movement of the first component.

10. The method of claim 1, wherein the second component is one of a ski-hatch of the seating arrangement, the ski hatch comprising an openable aperture in the bulkhead, and a lid of an armrest adjacent to the rear seat, and wherein the signal indicative of the state of the second component comprises an indication of a position of the second component.

11. The method of claim 10, comprising commencing movement of the first component only if the second component is in a closed position.

12. The method of claim 1 wherein the second component is a squab or seat cushion of a front seat of the seating arrangement, the front seat being positioned directly ahead of the rear seat and wherein the signal indicative of the state of the second component comprises an indication of a position of the squab or seat cushion of the front seat, the method comprising commencing movement of the first component only if the squab or seat cushion of the front seat is outside a second clash zone between the front seat and the rear seat.

13. The method of claim 12, comprising moving the squab or seat cushion of the front seat to a position outside the second clash zone if the signal indicative of the state of the second component indicates that the squab or seat cushion of the front seat is in the second clash zone, and then commencing movement of the first component.

14. The method of claim 13, comprising determining whether the front seat is occupied prior to moving the front seat, and moving the front seat to a safe configuration if the front seat is occupied, and to a folded configuration if the front seat is not occupied.

15. The method of claim 14, wherein, when the front seat is in the safe configuration, the squab of the front seat is generally upright to allow the front seat to accommodate a passenger, and the front seat is displaced forward within the vehicle to increase space available for movement of the rear seat.

16. The method of claim 1, comprising monitoring for a pinch condition after commencing movement of the first component, and ceasing the movement upon detection of a pinch condition.

17. The method of claim 1, comprising controlling an actuator to release the first component prior to commencing movement of the first component.

18. A controller for a vehicle seating arrangement, the controller being configured to perform the method of claim 1.

19. A vehicle comprising the controller of claim 18.

20. A non-transitory computer readable medium comprising computer readable code for controlling a computing device to perform the method according to claim 1.

* * * * *